(12) United States Patent
Leekley et al.

(10) Patent No.: US 9,549,024 B2
(45) Date of Patent: Jan. 17, 2017

(54) ROUTING AND SYNCHRONIZATION SYSTEM, METHOD, AND MANAGER

(71) Applicants: Gregory H. Leekley, Charlotte, NC (US); Alexander Savenok, Grandview, MO (US); Pavel Savenok, Wheaton, IL (US)

(72) Inventors: Gregory H. Leekley, Charlotte, NC (US); Alexander Savenok, Grandview, MO (US); Pavel Savenok, Wheaton, IL (US)

(73) Assignee: REMOTE MEDIA, LLC, Wheaton, IL (US)

( * ) Notice: Subject to any disclaimer, the term of this patent is extended or adjusted under 35 U.S.C. 154(b) by 537 days.

(21) Appl. No.: 14/099,348

(22) Filed: Dec. 6, 2013

(65) Prior Publication Data

US 2014/0164563 A1 Jun. 12, 2014

Related U.S. Application Data

(60) Provisional application No. 61/734,721, filed on Dec. 7, 2012.

(51) Int. Cl.
*H04L 29/08* (2006.01)
(52) U.S. Cl.
CPC ....... *H04L 67/1074* (2013.01); *H04L 67/1063* (2013.01)
(58) Field of Classification Search
CPC ............. H04L 67/1074; H04L 67/1063; H04L 41/5009; H04L 41/5025; H04L 41/5035; G06F 9/5061; G06F 9/541; G06F 8/51; G06F 8/68

(Continued)

(56) References Cited

U.S. PATENT DOCUMENTS 5,444,779 A 8/1995 Daniele
6,925,469 B2 8/2005 Headings et al.
(Continued)

OTHER PUBLICATIONS

An explanatory video demonstration of the subject invention is available at the following address. This video demonstration is otherwise unlisted/unsearchable at www.youtube.com. Author: Gregory H. Leekley (co-Applicant) Title: Vertigo Patent Video Creation Date: Feb. 9, 2016 https://www.youtube.com/watch?v=akfORuoqmcA&feature=youtu.be.

*Primary Examiner* — Tu Nguyen
(74) *Attorney, Agent, or Firm* — Christopher J. Scott

(57) ABSTRACT

A peer-to-peer (P2P) content delivery network delivers select data files to an end user. The content delivery network provides a client, a P2P gateway server, and a Resource Name Server (RNS) within a computer-populated network. The RNS caches data resource locations within the computer-populated network and resolves resource requests with optimal data resource locations within the computer-populated network. The gateway server requests and receives optimal data resource locations via the RNS; requests and receives data files from the computer-populated network via the optimal data resource locations; and processing received data files for data file delivery to the client. The network thus enables an origin-agnostic data delivery method for optimally delivering select data files to an end user. A data-routing governance or management utility governs/manages the content delivery network and associated methodology for providing industry rights management, compliance monitoring, and/or compliance reporting of data file transmissions.

33 Claims, 30 Drawing Sheets

(58) Field of Classification Search
USPC .......................................................... 709/217
See application file for complete search history.

(56) References Cited

U.S. PATENT DOCUMENTS

| | | |
|---|---|---|
| 7,643,459 B2 | 1/2010 | Miller et al. |
| 7,664,861 B2 | 2/2010 | Guntupalli et al. |
| 7,774,010 B2 | 8/2010 | Kokkonen et al. |
| 7,779,123 B2 | 8/2010 | Duggan |
| 8,090,861 B2 | 1/2012 | Miller et al. |
| 8,176,325 B2 | 5/2012 | Lai et al. |
| 8,180,853 B2 | 5/2012 | Lee et al. |
| 2002/0032019 A1 | 3/2002 | Marks et al. |
| 2003/0131245 A1 | 7/2003 | Linderman |
| 2003/0135639 A1 | 7/2003 | Marejka et al. |
| 2004/0031038 A1 | 2/2004 | Hugly et al. |
| 2005/0114562 A1 | 5/2005 | Barnes et al. |
| 2005/0180418 A1 | 8/2005 | Andersen et al. |
| 2006/0075225 A1 | 4/2006 | Flynn et al. |
| 2006/0107036 A1 | 5/2006 | Randle et al. |
| 2006/0133428 A1 | 6/2006 | Guthrie et al. |
| 2007/0016688 A1 | 1/2007 | Hester et al. |
| 2007/0038574 A1 | 2/2007 | Fanning et al. |
| 2007/0168409 A1 | 7/2007 | Cheung |
| 2007/0237133 A1 | 10/2007 | Woods et al. |
| 2007/0256073 A1 | 11/2007 | Troung et al. |
| 2008/0016205 A1 | 1/2008 | Svendsen |
| 2008/0071561 A1 | 3/2008 | Holcombe |
| 2008/0089299 A1 | 4/2008 | Lindsley et al. |
| 2008/0178094 A1 | 7/2008 | Ross |
| 2008/0189255 A1 | 8/2008 | Zatloukal et al. |
| 2008/0256255 A1 | 10/2008 | Mordovskoi et al. |
| 2008/0294788 A1 | 11/2008 | Wu et al. |
| 2009/0037960 A1 | 2/2009 | Melby |
| 2009/0055471 A1 | 2/2009 | Kozat et al. |
| 2009/0172157 A1 | 7/2009 | Zhang |
| 2009/0210549 A1 | 8/2009 | Hudson et al. |
| 2009/0265022 A1 | 10/2009 | Kirovski et al. |
| 2009/0305694 A1 | 12/2009 | Zheng et al. |
| 2009/0320075 A1 | 12/2009 | Marko |
| 2009/0327481 A1 | 12/2009 | Rickard et al. |
| 2010/0106799 A1 | 4/2010 | Calabrese |
| 2010/0138552 A1 | 6/2010 | Oh et al. |
| 2010/0142557 A1 | 6/2010 | Priddle et al. |
| 2010/0162126 A1 | 6/2010 | Donaldson et al. |
| 2010/0169493 A1 | 7/2010 | Yamakawa et al. |
| 2010/0169506 A1 | 7/2010 | Krzanowski et al. |
| 2010/0202450 A1 | 8/2010 | Ansari et al. |
| 2010/0205319 A1 | 8/2010 | Beers et al. |
| 2010/0223648 A1 | 9/2010 | Tian |
| 2010/0250704 A1 | 9/2010 | Kittel |
| 2010/0250737 A1 | 9/2010 | Bremler-Barr et al. |
| 2010/0268361 A1 | 10/2010 | Mantel et al. |
| 2010/0274848 A1 | 10/2010 | Altmaler et al. |
| 2010/0306257 A1 | 12/2010 | Levy |
| 2010/0332568 A1 | 12/2010 | Morrison et al. |
| 2011/0015968 A1 | 1/2011 | Carlson |
| 2011/0022652 A1 | 1/2011 | Lai et al. |
| 2011/0029649 A1 | 2/2011 | Tian et al. |
| 2011/0035031 A1 | 2/2011 | Faenger et al. |
| 2011/0040878 A1 | 2/2011 | Luzzatti et al. |
| 2011/0072475 A1 | 3/2011 | McKiel, Jr. |
| 2011/0093607 A1 | 4/2011 | Wang et al. |
| 2011/0099096 A1 | 4/2011 | Shanley et al. |
| 2011/0106673 A1 | 5/2011 | Shanley et al. |
| 2011/0119165 A1 | 5/2011 | Zee |
| 2011/0167115 A1 | 7/2011 | Gilbert et al. |
| 2011/0179184 A1 | 7/2011 | Breau et al. |
| 2011/0179328 A1 | 7/2011 | Souza et al. |
| 2011/0225417 A1 | 9/2011 | Maharajh et al. |
| 2011/0279635 A1 | 11/2011 | Periyannan et al. |
| 2011/0288970 A1 | 11/2011 | Kidron et al. |
| 2011/0302303 A1 | 12/2011 | Dunkeld et al. |
| 2012/0030367 A1 | 2/2012 | Lei et al. |
| 2012/0054146 A1 | 3/2012 | Gupta et al. |
| 2012/0072610 A1 | 3/2012 | Svendsen |
| 2012/0072852 A1 | 3/2012 | Svendsen et al. |
| 2012/0072932 A1 | 3/2012 | Atwater et al. |
| 2012/0072948 A1 | 3/2012 | Yang et al. |
| 2012/0102116 A1 | 4/2012 | Shi et al. |
| 2012/0116937 A1 | 5/2012 | Van Biljon et al. |
| 2012/0117605 A1 | 5/2012 | Miao et al. |
| 2012/0124178 A1 | 5/2012 | Sparks |
| 2012/0124211 A1 | 5/2012 | Kampas et al. |
| 2012/0124678 A1 | 5/2012 | Shintani et al. |
| 2012/0239647 A1 | 9/2012 | Savenok et al. |
| 2012/0304233 A1* | 11/2012 | Roberts ............ H04N 21/23113 725/82 |

* cited by examiner

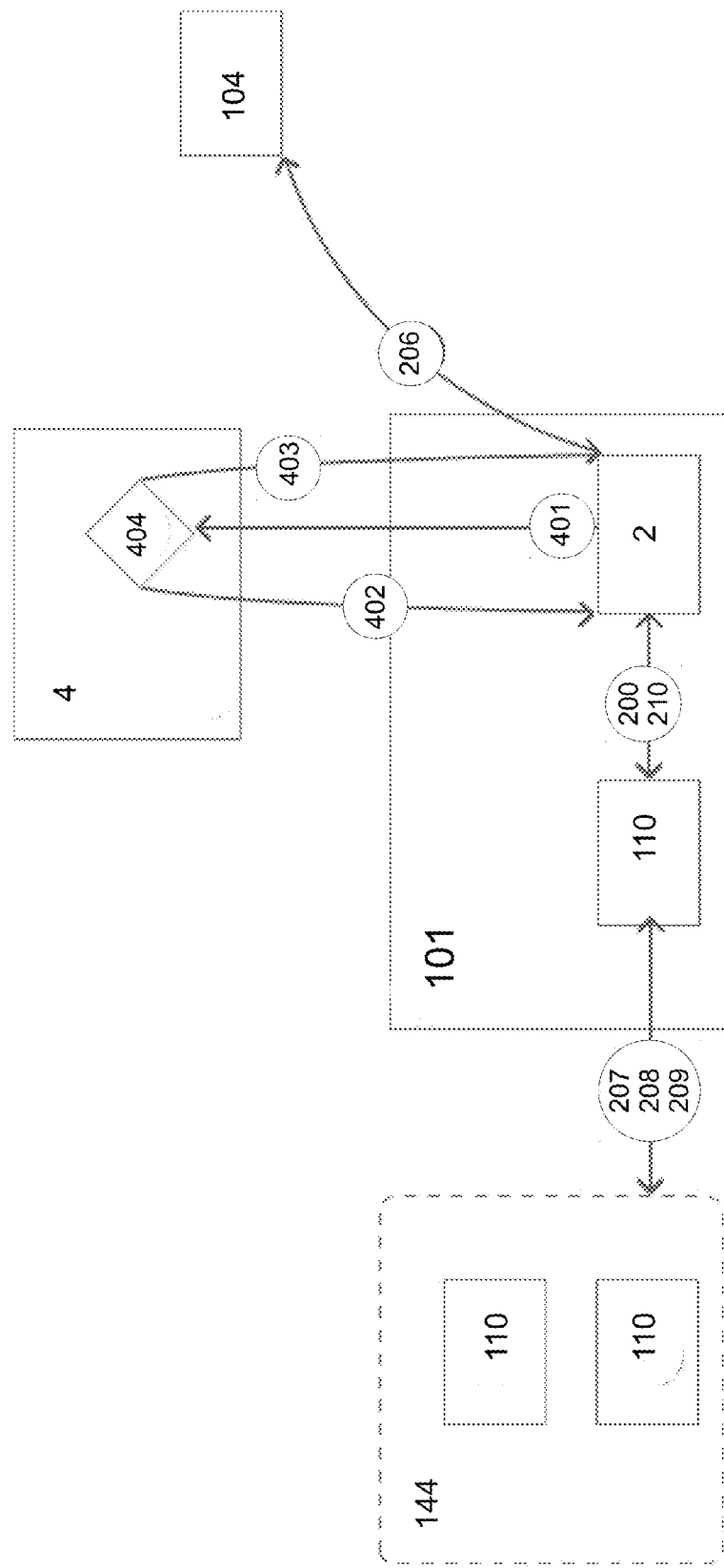

ROUTING AND SYNCHRONIZATION SYSTEM, METHOD, AND MANAGER

PRIOR HISTORY

This U.S. Provisional Patent Application claims the benefit of U.S. Provisional Patent Application Ser. No. 61/734,721 filed in the United States Patent and Trademark Office on 7 Dec. 2012, which provisional patent application claimed the benefit of U.S. patent application Ser. No. 13/065,254, filed in the United States Patent and Trademark office on 17 Mar. 2011, issued as U.S. Pat. No. 8,589,171 on 19 Nov. 2013; U.S. patent application Ser. No. 13/134,044, filed in the United States Patent and Trademark Office on 26 May 2011, issued as U.S. Pat. No. 8,478,719 on 2 Jul. 2013; U.S. patent application Ser. No. 13/199,474, filed in the United States Patent and Trademark Office on 30 Aug. 2011, issued as U.S. Pat. No. 8,688,631 on 1 Apr. 2014; and International Patent Application No. PCT/US2012/000060, filed in the United States Patent and Trademark Office as International Receiving Office on 6 Feb. 2012, the specifications of which are hereby collectively incorporated herein by reference thereto so far as allowed.

BACKGROUND OF THE INVENTION

Field of the Invention

The present invention generally relates to content delivery network and associated methodology that provides a media compliance engine. The media compliance engine according to the present invention operates by way of local gateway servers, which utilize peer-to-peer networks and multiple data origins (clouds) to optimize the delivery of media and streamline the reporting process. The media compliance engine according to the present invention matches requests from streaming providers with an optimized data source and network. By doing this the media compliance engine can minimize bandwidth consumption, licensing, and reporting costs.

SUMMARY OF THE INVENTION

The present invention provides a peer to peer Content Delivery Network (CDN) that can be added to any existing standard content delivery network, or server configuration without any changes to back end systems. The peer to peer CDN according to the present invention is created when the end user installs a local peer to peer gateway server on the client machine. The gateway server receives request(s) from the media consuming client via encrypted or unencrypted connections (e.g. HTTP, HTTPS, Secure Socket, and/or Socket).

The local gateway server acts as a peer on the peer-to-peer network and has an encrypted cache for storing data for delivery to other peers or for local delivery to a data consuming client. The local gateway server can also pull resources from a related remote data source (e.g. a server or other CDN). The consuming client would only need to pass a single request to the gateway server, and the gateway server manages the resources and network connection independently of the client. This type of setup enables the delivery of media not only to stand alone desktop applications but also to browsers and media players, and mobile applications that have standard web browsers capabilities (e.g. HTTP, HTTPS, and/or Socket).

The present invention provides a peer-to-peer (P2P) gateway server that receives communication from a client on a local machine. The communication or request can be formatted as a standard HTTP request directed at the local gateway server which will be registered under a local domain name. It is contemplated that the request(s) may be formatted differently if a new transfer protocol is created that references a reserved port where the gateway server would reside. In this case, the request would be formatted slightly differently (i.e. without the HTTP prefix).

The invention provides a Resource Name Server (RNS), which RNS caches resource URL's, and resource locations (i.e. IP addresses) and resolves resource requests with machine addresses. The general process or methodology for an un-matched media type would be as follows.

1. Client sends a request for resources to the gateway server;
2. The gateway server then sends the request to the RNS to resolve the resource request with a resource address;
3. Once the resource request is matched with the optimal (least costly) resource locations, the resource location data is returned to the gateway server;
4. The gateway then sends the request for resource data to the appropriate machines or server clusters;
5. The machines or service clusters then respond by serving the data that is requested to the gateway server located on the local machine.
6. The gateway process organizes and validates the data and then delivers the resources to the client on the local machine.

The reader will note that in a traditional Client-Server relationship, a client requests data from a server and the server delivers data pursuant to client request. In a traditional unmanaged peer-to-peer network each peer can act as both a server (i.e. a deliverer of data) and a client (i.e. a receiver of data). In an unmanaged environment a request for data is passed from peer to peer until a file is located.

A managed peer to peer network has a centralized server that indexes resources. The peers in such a network report and register their availability, thus making it easier and quicker to locate a resource. In a hybrid system a peer to peer network is used alongside a centralized data source/indexing server to provide the low costs of peer delivery but the consistency and speed of a centralized data source and in order to expedite resource delivery as in the managed peer to peer network. In this situation a mix of data origin server and peers deliver the data.

According to the present invention, the client is a stand-alone client, and the data request originates and is consumed by a stand-alone client (browser, desktop or mobile application). Unlike the networks prefaced hereinabove, the request for data does not originate with the peer, but with a stand-alone client as in a traditional client server relationship.

The gateway server receives the request and then resolves the request for a resource with a Resource Name Server (i.e. resource indexing server). The RNS responds with resource locations (IP address), which can be resource origins or peers. Given that the network is data origin agnostic, peer data is not managed by a central data server, but rather indexed on the RNS as requests are passed and cached at the gateway server.

Accordingly, in such a network the data source is separate from the resource indexing server, thus allowing any request for data by a stand-alone client to be filled from the data origin or a peer-to-peer (P2P) network, since the data within the P2P network is cached when the request is sent from the stand-alone client.

BRIEF DESCRIPTION OF THE DRAWINGS

Other features of our invention will become more evident from a consideration of the following brief descriptions of illustrations of the subject invention:

FIG. 13 is a diagrammatic depiction of how a local gateway server is validated via a plug-in.

FIG. 33 is a diagrammatic depiction of methodology relating to routing HTTP requests from browsers and/or other media-consuming clients.

DETAILED DESCRIPTION OF THE PREFERRED EMBODIMENT/METHODOLOGY

Figure 1:
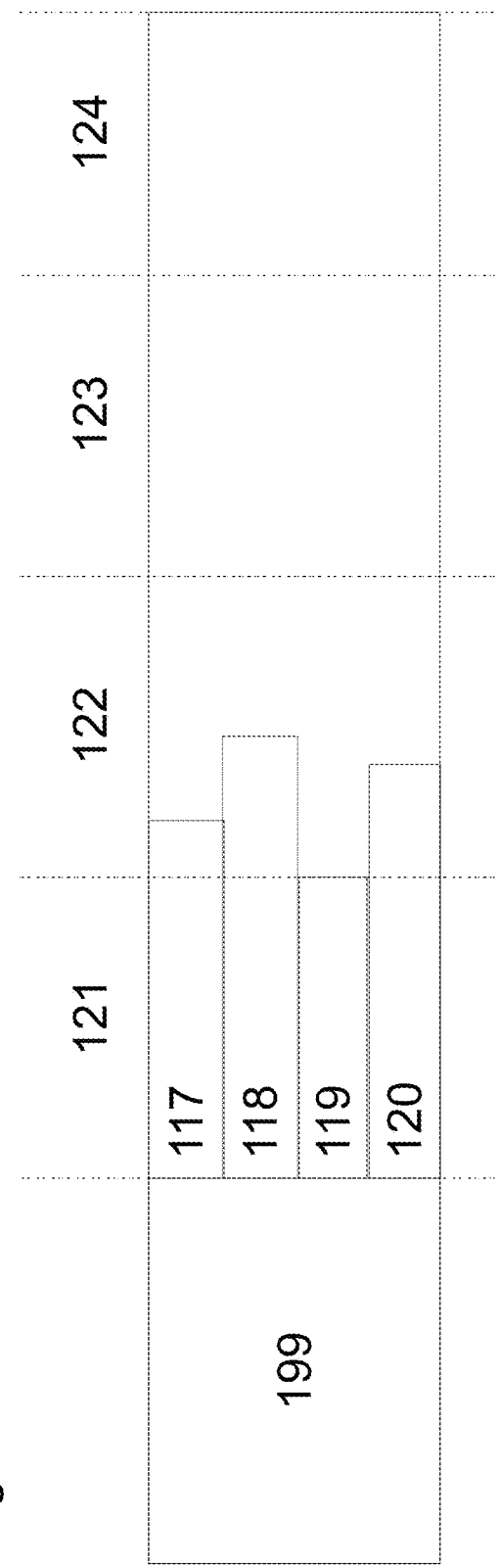
FIG. 1 is a diagrammatic depiction of a fragmented arrangement for a data file including rows of sub-stream packets and columns of validation packets.

Referencing the drawings now with more specificity, the present invention provides a Content Delivery Network and associated Methodology for Cloud Agnostic Peer-to-Peer Data Streaming. As discussed above, the invention comprises a peer-to-peer (P2P) gateway server as depicted and referenced at 3. The P2P gateway server 3 receives communications (as at 200) from the client 2 on the local machine 101.

These requests may be formatted as standard HTTP requests directed at the local gateway server 3 which will be registered under a local domain name. While routing HTTP requests from web browsers and other devices may include the use of locally registered domain names and protocols are viable methods, the following method is preferred when routing HTTP requests from browsers and other media consuming clients.

The consuming client 2 is given a Fully Formatted domain name to the peer-to-peer remote servers 4 or Resource Name Servers 4. For the sake of simplicity, the reader will consider the domain name www.rns_server.com. In order to request media 401 through the peer-to-peer Content Delivery Network (CDN) as at 144, the client 2 contains a Uniform Recourse Locator (URL) with RNS public domain name, and a GET variable with the location of the requested media, something of the form www.rns_server.com?media=www.somemediasource.com/media.mp4&protocol=http.

When the RNS 4 receives the request it queries 404 two distinct data bases. The first query uses the requesting devices public Internet Protocol (IP) address to identify if any network peers 3 exist within the requesting devices local network 101. The second query searches the resource database to identify peers 3 with the requested media available for streaming (as at 200, 207, 208, 209, and 210) within the peer-to-peer (P2P) CDN 144.

Based on the result of queries 404 the following things could happen. Firstly, if there is no registered peer on the local network the request is redirected as at 403 to the media's remote source 104, and the P2P network 144 will not be utilized. If there is a registered peer 3 within the local network 101, the request is redirected as at 402 to the local network peer 3 along with the resource location and availability data which was retrieved in the second query 404. The local network peer 3 then handles the media stream (as at 200, 207, 208, 209, and 210).

The reader will thus appreciate that the Resource Name Server (RNS) as referenced at 4, is central to the practice of the present invention. The RNS 4 caches resource URL's and resource locations (IP addresses), and resolves resource requests with machine addresses (IP addresses). The general process for an un-matched media type would be as follows. The client 2 sends a request for resources (as at 200) to the gateway server 3.

Figure 5:
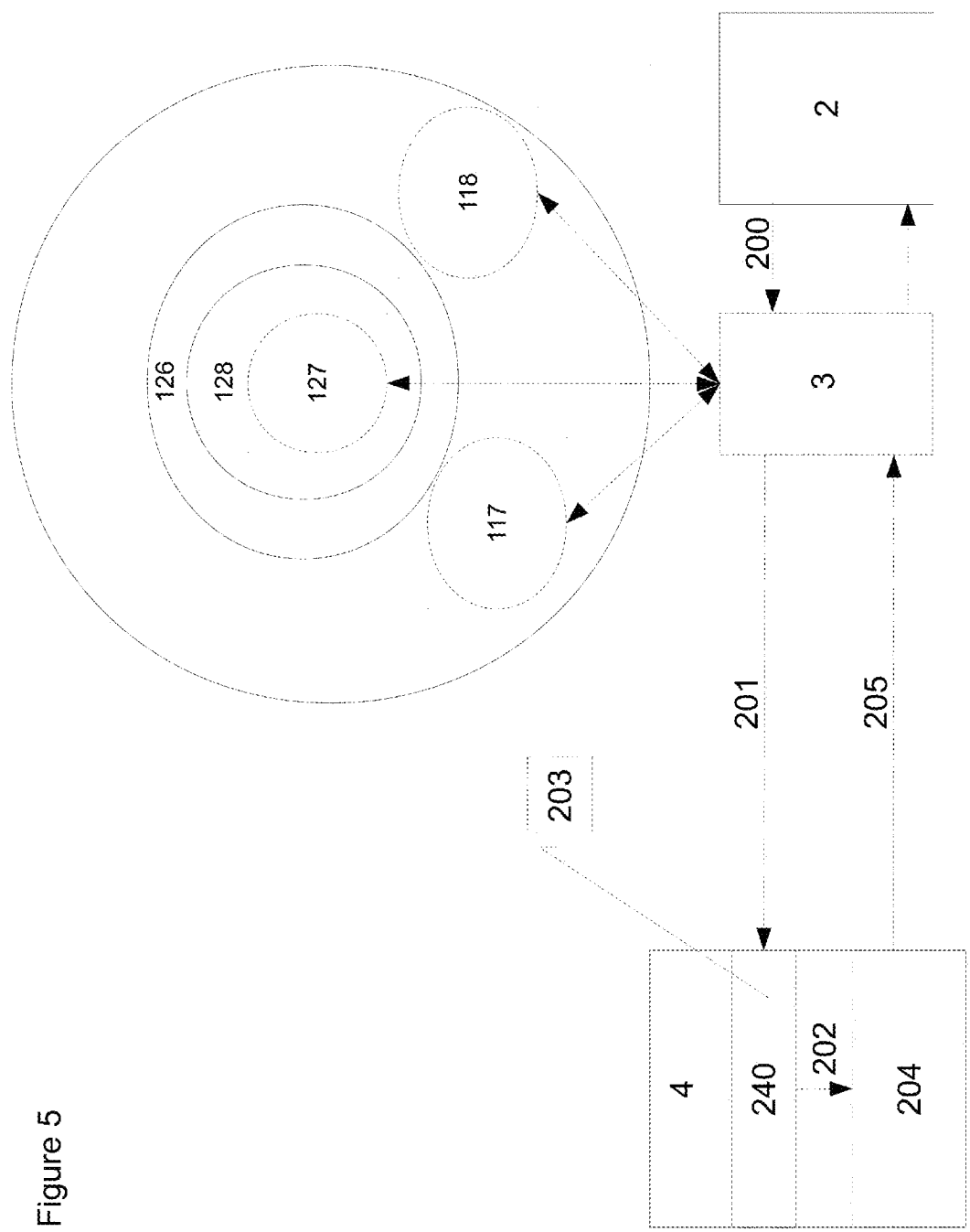
FIG. 5 is a diagrammatic depiction of a resource name server system overview.

The gateway server 3 then sends the request (as at 201) to the compartmented RNS 4 to resolve (as at 202) the incoming resource ID/URL request (as at 203) with a resource address (as at 204), which resource or IP address is then communicated back (as at 205) to the gateway server 3 as more particularly depicted in FIG. 5. In other words, once the resource request 203 is matched as at 202 with optimal (e.g. (a) most price efficient or (b) highest sound quality of source) resource locations 204, the resource location data or IP address(es) 204 are returned as at 205 to the gateway server 3.

The gateway server 3 then sends (as at 206, 207, and 208) request(s) for resource data to the appropriate machines (102 and/or 103) or server clusters as at 104. The machines 102/103 or server clusters 104 then respond by serving (as at 209) the data that is requested to the gateway server 3 located on machine 101. The gateway server 3 on machine 101 processes (i.e. organizes and validates) the data as served at 209, and then delivers 210 the resources to the client 2.

Figure 7:
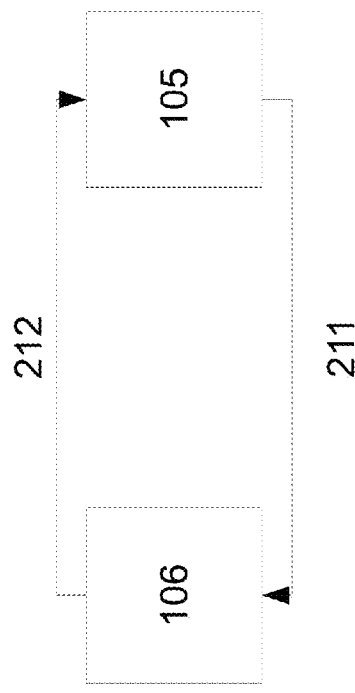
FIG. 7 is a diagrammatic depiction of a traditional client-server relationship whereby a client requests data and the server delivers data.
Figure 8:
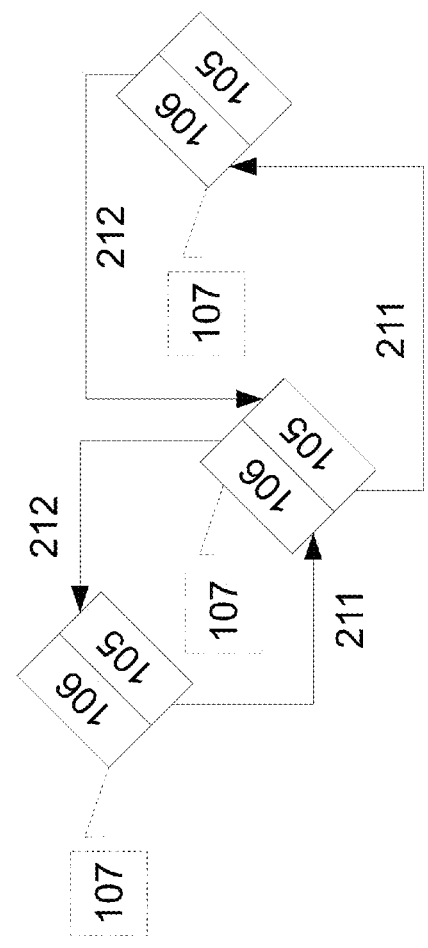
FIG. 8 is a diagrammatic depiction of a peer-to-peer unmanaged network overview whereby each peer can act as both a server and a client where requests for data are passed from peer to peer until a file is located.
Figure 9:
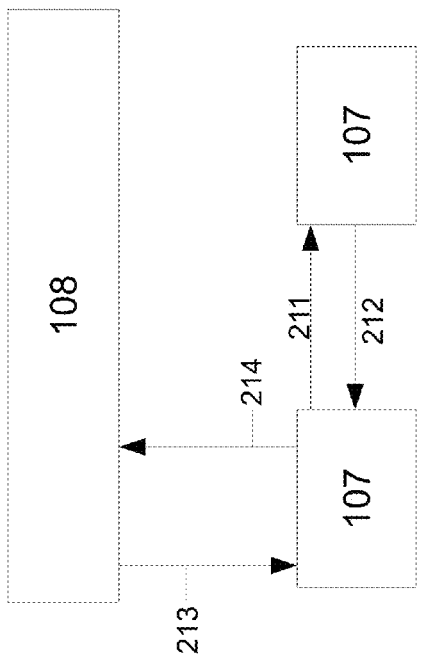
FIG. 9 is a diagrammatic depiction of a peer to peer managed network overview in which a centralized server indexes resources and in which the peers report and register their availability.
Figure 10:
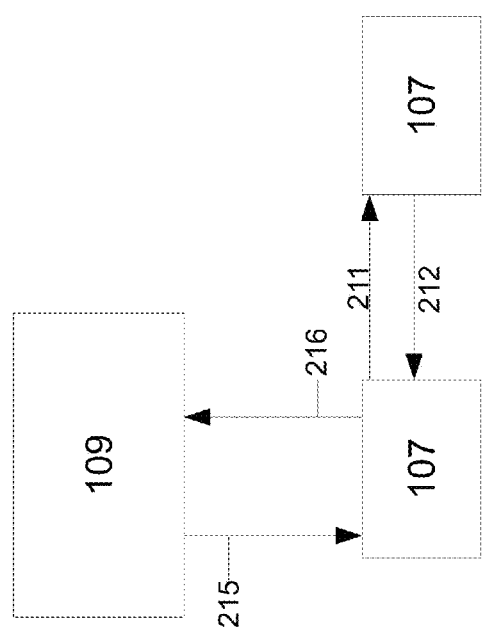
FIG. 10 is a diagrammatic depiction of a peer to peer centralized hybrid network overview with which a peer to peer network is used alongside a centralized data source/indexing server to provide the low costs of peer delivery but the consistency and speed of a centralized data source.
Figure 11:
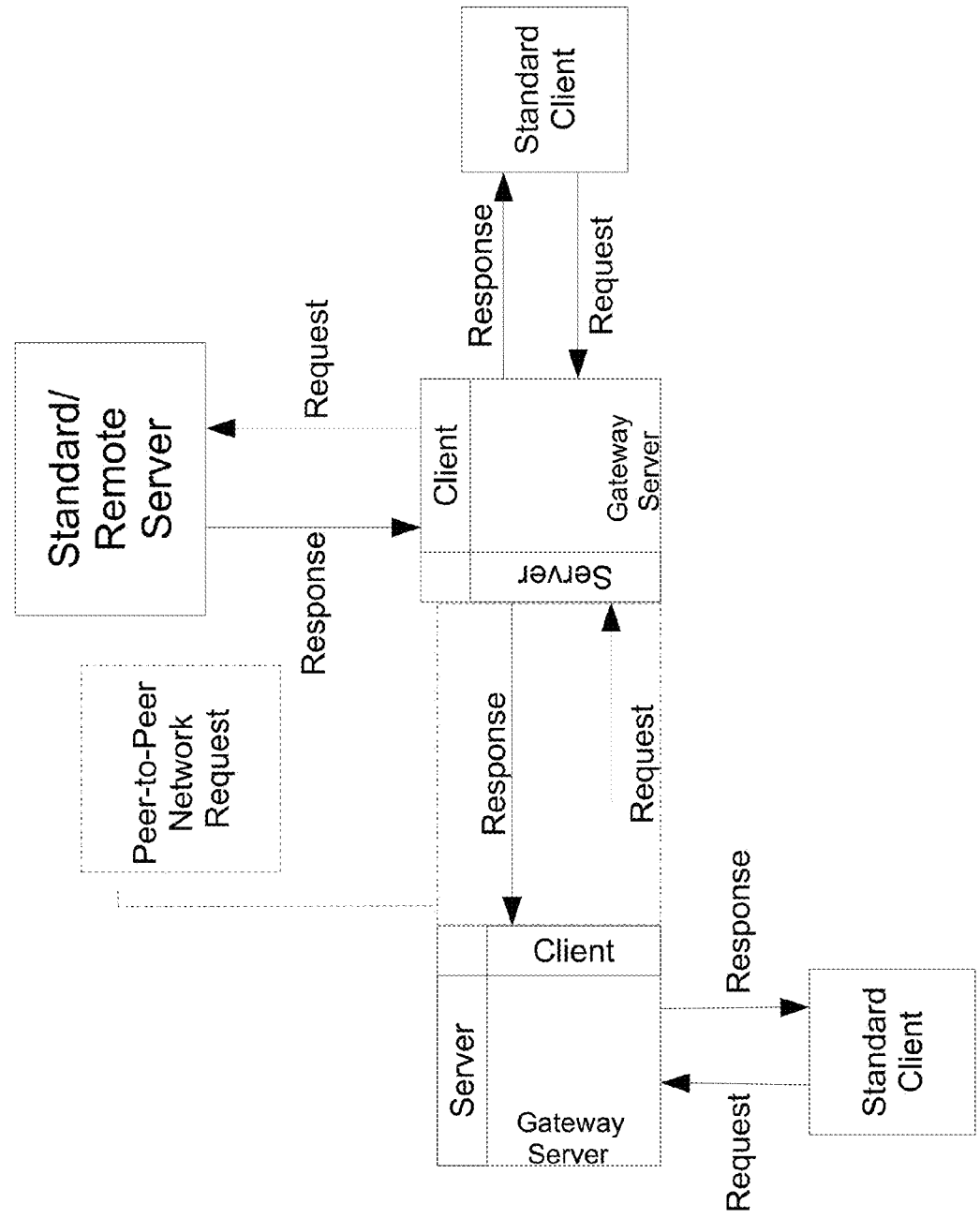
FIG. 11 is a diagrammatic depiction of a peer to peer gateway server network overview.

Certain client-server-peer relationships are basically diagrammatically depicted in FIGS. 7, 8, 9, and 10. A Traditional client-server relationship is depicted in FIG. 7; an unmanaged peer-to-peer network is depicted in FIG. 8; a managed peer-to-peer network is depicted in FIG. 9; and a centralized/hybrid peer-to-peer network is depicted in FIG. 10.

In a traditional client-server relationship a client 105 requests 211 data from a server 106, and the server 106 delivers 212 the data in a cyclic manner as depicted in FIG. 7. In a traditional, unmanaged peer to peer network each peer (or client/server combination) 107 can act as both a server 106 for delivering data and a client 105 for receiving data. In an unmanaged environment as generally depicted in FIG. 8, a request 211 for data is passed from peer 107 to peer 107 until a file is located.

A managed peer to peer network as generally depicted in FIG. 9 has a centralized, resource-indexing server 108 that functions to index resources. The indexed resources are delivered 213 to the peers 107 following requests 214 thereby. The indexed resource availability is then reported and registered by the peers 107. This type of arrangement makes it easier and quicker to locate a resource.

In the hybrid system generally depicted in FIG. 10, a peer to peer network is used alongside a centralized data source/indexing server 109. Both indexed resources and data are delivered 215 to the peers 107 from the server 109 following requests 216 for resources and data by the peer(s) 107. This type of arrangement provides the low costs of peer delivery but the consistency and speed of a centralized data source and in order to expedite resource delivery as in the managed peer to peer network. In this situation a mix of data originate from server 109 and peers 107 deliver the data.

Figure 2:
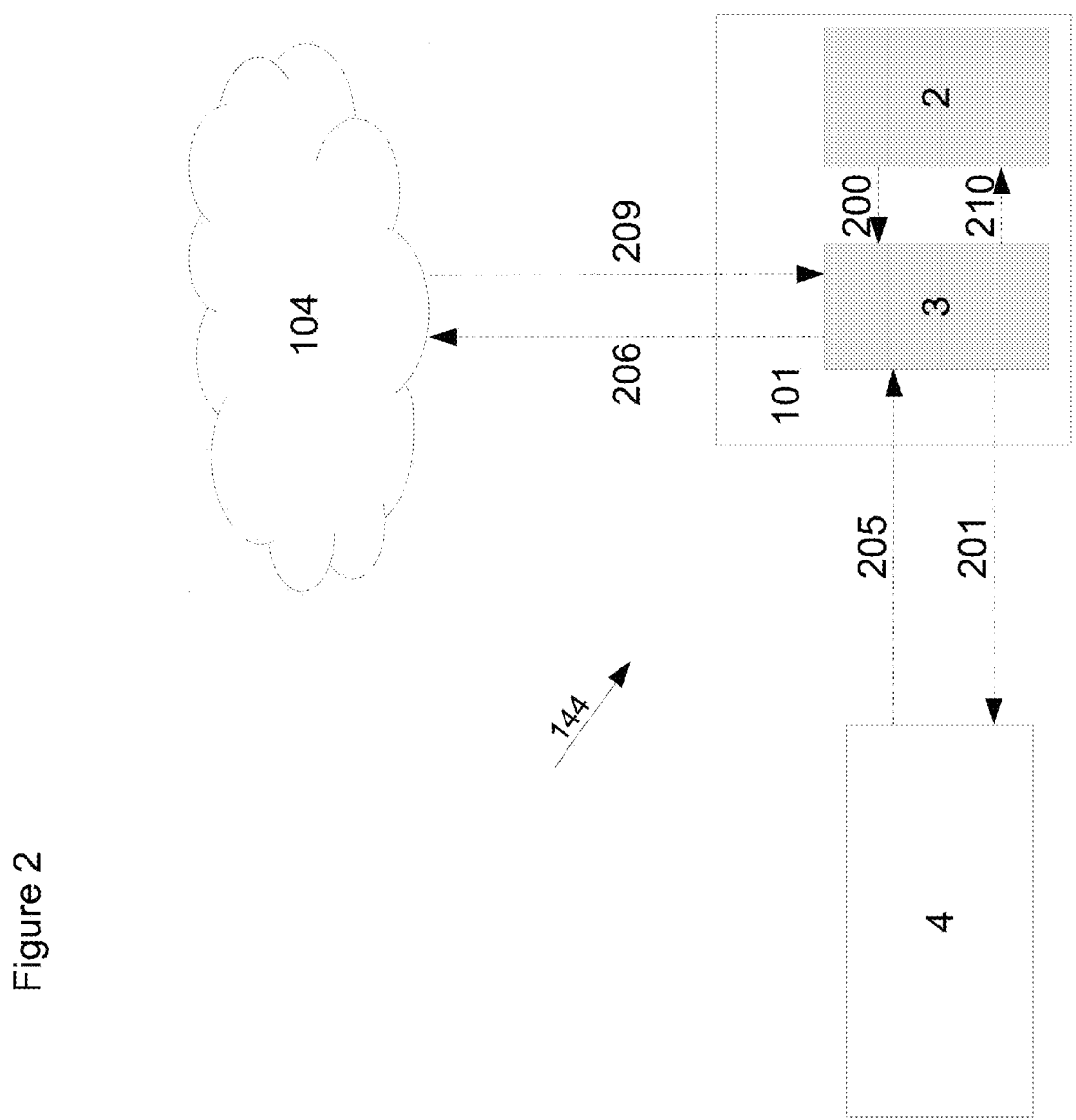
FIG. 2 is a first diagrammatic depiction of a system overview according to the present invention, showing a gateway server positioned intermediate a cloud of server clusters and a resource name server.
Figure 3:
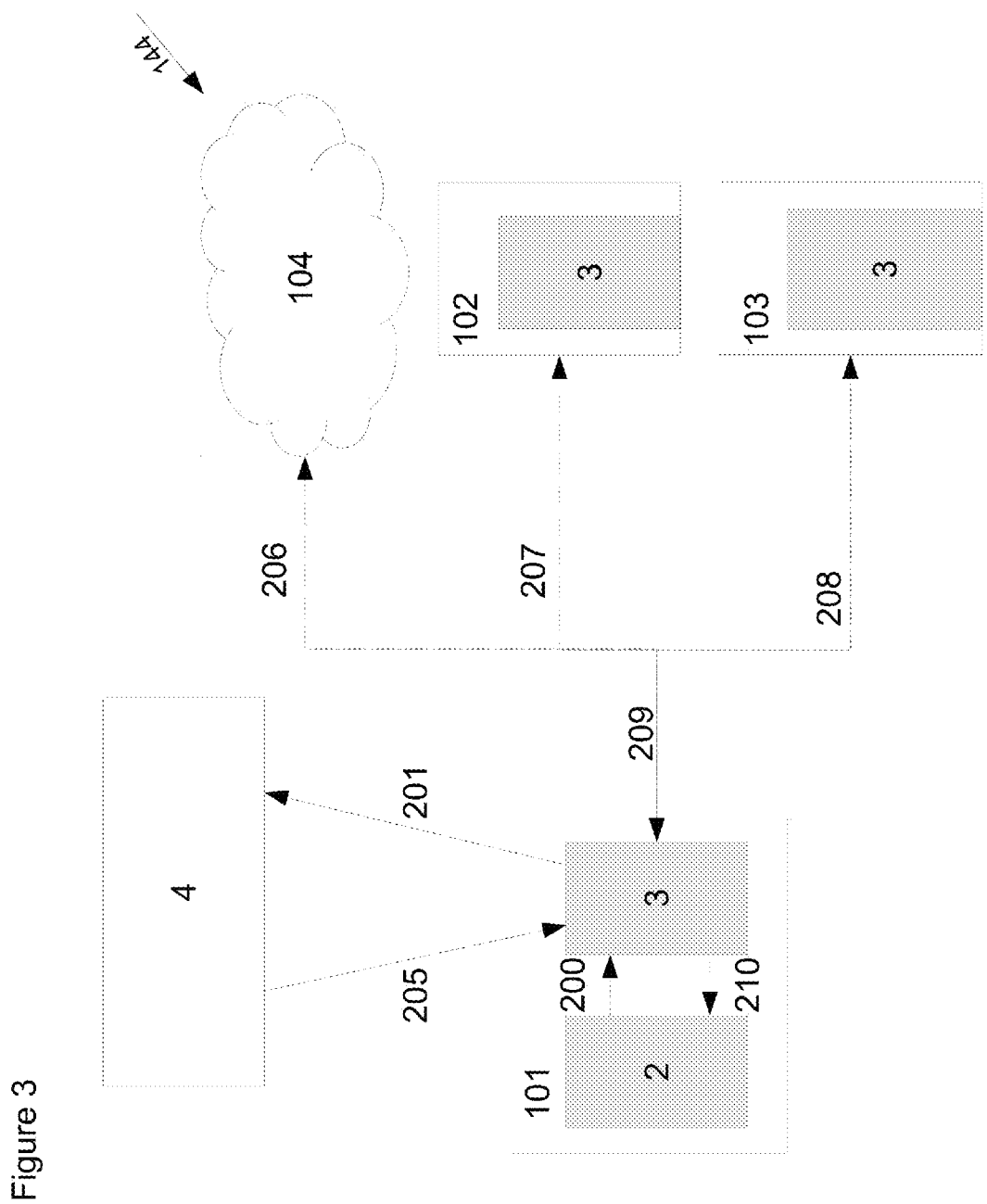
FIG. 3 is a second diagrammatic depiction of a system overview according to the present invention, showing a gateway server positioned intermediate a cloud of server clusters and a resource name server.

In the origin-agnostic peer-to-peer Content Delivery Network (CDN) 144 generally depicted in FIGS. 2 and 3, the client 2 is a stand-alone client. In other words, the data request originates and is consumed by a stand-alone client 2 (i.e. browser, desktop or mobile application). Unlike in other networks, the request for data does not originate with a peer 107, but with a stand-alone client 2 as in a traditional client server relationship as generally depicted in FIG. 7.

The gateway server 3 receives the request from the client 2, and then resolves the request for a resource with a Resource Name Server or RNS or resource indexing server 4. The RNS 4 responds with resource locations (e.g. IP address), which resource locations can be resource origins or peers. Given that the network is data origin-agnostic, peer data is not managed by a central data server, but rather indexed on the RNS 4 as requests are passed and cached at the gateway server 3.

In such a network the data source is separate from the resource indexing server or RNS 4. This allows any request for data by a stand-alone client 2 to be filled from the data origin or a peer-to-peer network, since the data within the peer-to-peer network is cached when the request is sent from the stand-alone client 2.

The present invention is not limited to using HTTP or Web Sockets, but could also use standard file transfer protocols (FTP, WebDAV, SMB, AFP etc. . . . ). In this case the client would be a standalone FTP (or any standard file transfer protocol client). If the FTP directory (or WebDAV, SMB, AFP etc. . . . ) is mounted as a network drive within an operating system, the operating system would act as the client. In this situation the gateway server would operate as a file server.

Notably, there are some security concerns in such an arrangement. The proposed solution or arrangement according to the present invention is potentially vulnerable to "man in the middle attacks" and/or unauthorized client access. These concerns can be addressed by providing certain client and/or server authentication means. The client and/or server authentication means basically function to verify client and/or server authenticity.

The client and/or server authentication means may be exemplified by a number of different mechanisms as described in more detail hereinafter. For example, said authentication means may be provided by way of media plug-in authentication (client authentication) and browser extensions that validate the local server to ensure that it is not a corrupt server (this would require some sort of unique ID, session tokens, or key pairing).

Client sided scripts along with plug-ins can also be used to authenticate both the client and the server by embedding some form of verification identification within the plug-in, which is then passed to the client-sided scripts which validate the verification identification using AJAX. The use of client-sided scripts in tandem with a browser plug-in is preferred as it provides both client and server verification in one process. This method is discussed below.

Figure 12:
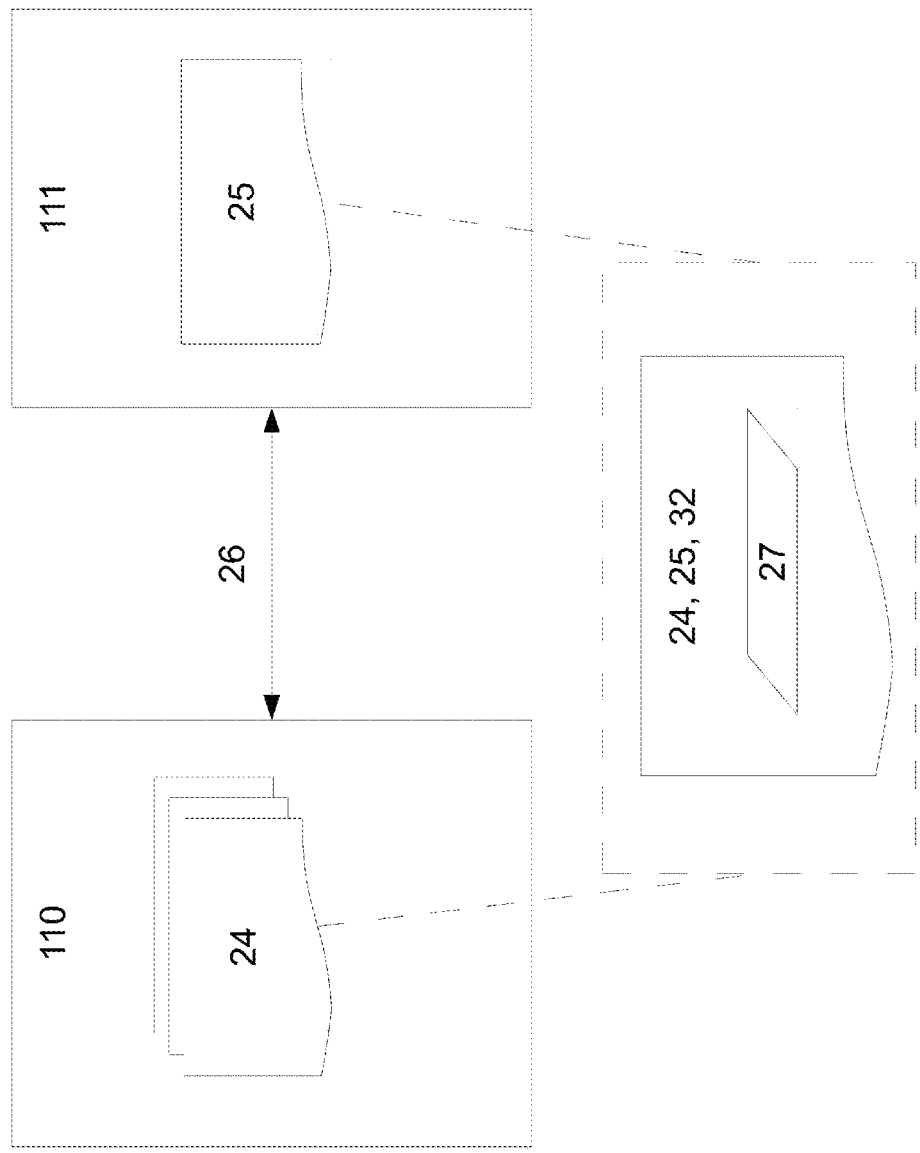
FIG. 12 is a diagrammatic depiction of how secure connections are structured view a local server and browser.
Figure 13:
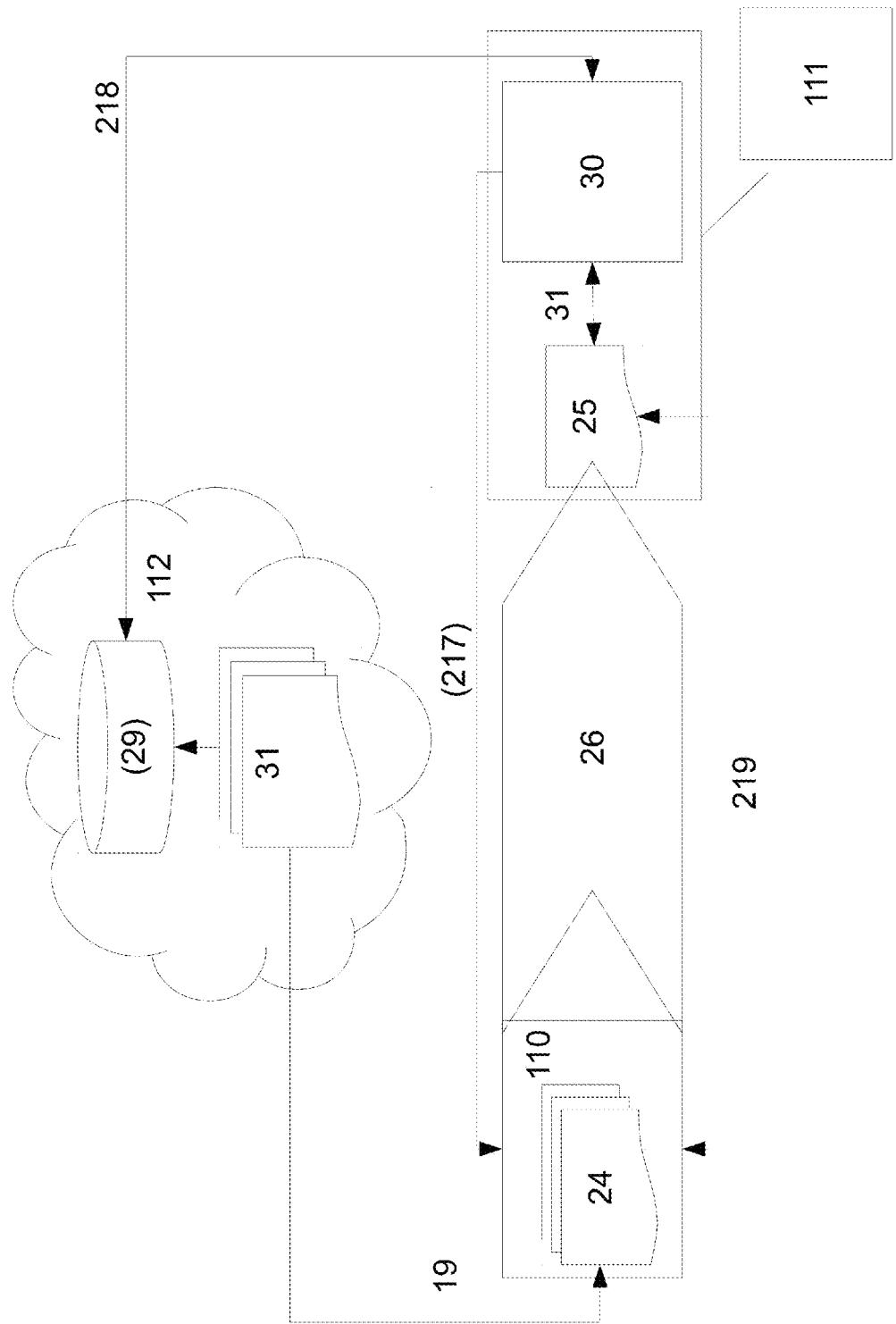

Referencing FIGS. 12 and 13, the reader will consider client verification via browser plug-in and client sided scripts. The process of creating a secure connection begins with the installation of the local server. When installed, the server creates a self-signed certificate, and adds the self-signed certificate to the root certificate tree. This enables the server to create a secure connection from a browser.

To add another layer of security the local server 110 loads multiple instances of a media processing browser plug-in 24 (e.g. flash, sliver light, etc. . . . ). The local server 110 can easily load as many as 1,000 multiple instances of a media processing browser plug-in 24. Each instance has embedded within it a unique encryption key as at 27. Instead of loading multiple instances, the encryption key 27 can be injected into the plug-in component file if the plug-in libraries allow for custom code injection.

When a browser creates a secure connection as at 26, the server 110 creates a unique session for the initiated connection, and then pairs the session with a media plug-in instance 24 and its embedded encryption key 27, or creates an encryption key 27 and injects it into the plug-in component file. The plug-in component file 25 is then loaded into the browser 111. The plug-in file 25 encrypts all the requests that come from the browser 111 via client-sided script and sends them to the server 110 via the encrypted connection 26. The unique encryption key 27 can also be a unique token used to sign the requests to validate them.

In order to retrieve the encryption key or token 27 one would have to decompile the plug-in file 25 served by the local server 110, and then re-establish a connection with the server 110 using a new "cracked" plug-in instance. However, since the server 110 selects a different encryption key 27 with every session, the moment the new secured socket connection 26 is established the previous encryption key 27 expires. This makes the encryption key 27 retrieved via decompiling worthless.

One of the primary concerns about using a local server to deliver content is the possibility of a "man in the middle attack" in which scenario malicious software could pose as a valid gateway and possibly intercept user data. In order to avoid this form of attack, the present system employs methods that require the local server 110 to verify the authenticity of a valid gateway by presenting a valid server authentication identification 31 via the browser plug-in component 25. The process is described in more detail hereinafter.

Every local gateway server 110 registers (as at 19) itself with the remote host 112 by creating a verification identification 31 that is linked to the public internet protocol of the local machine. This verification identification 31 and its related public internet protocol are stored in a database 29 on the remote host 112. When a web page 30 is loaded that will be using the local gateway server 110, the browser 111 sends a request (as at 217) to the local server 110. The server 110 responds by presenting its verification identification 31.

The browser 111 then sends a request (as at 218) with the verification identification 31 to the remote host 112. If the verification identification 31 matches the internet protocol address and the verification identification stored in the remote database 29, the remote server 112 sends a response along pathway 218 validating the local gateway server 110. After verification, the browser 111 then proceeds to load (as at 26) the media plug-in 24 from the local server 110. The media plug-in 24 then creates a secure connection 219 to the local gateway server 110 over which it will deliver data (e.g. music-based data).

Figure 6:
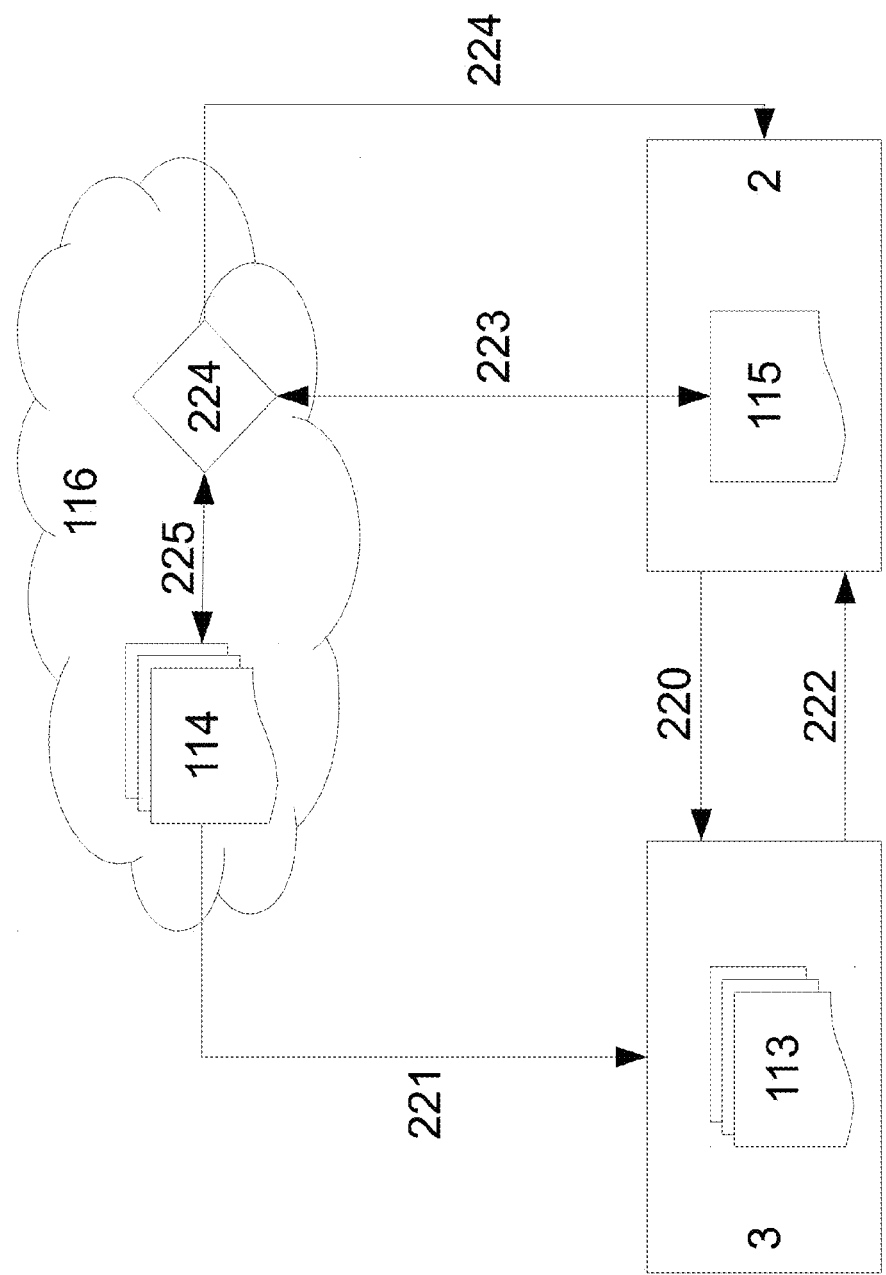
FIG. 6 is a diagrammatic depiction of a non-plug-in security measure overview.

Referencing FIG. 6, the reader will consider a non-plug-in security measure. A method that does not require the use of a media plug-in according to the present invention involves having the client 2 send a request (as at 220) for registered session identification 113 from the gateway server 3 to validate its authenticity. A session identification 114 is pre-registered (as at 221) by the gateway server and is invalid after a single authentication.

This requires that the gateway server 3 register multiple sessions 114 ahead of time, and each session identification 113 is valid only for a single validation. The gateway server 3 presents (as at 222) the session identification 113 to the client 2. The client 2 then validates (as at 223) the received session identification 115 with the verification server 116. The verification server 116 matches (as at 224 and 225) the session identification 115 sent by the client 2 with registered session identifications 114. If a match is found then the verification server 116 confirms (as at 224) to the client 2 the validity of the gateway server 3.

There are other alternative methods to guarantee a valid connection, including an operating system integration which would have a local domain name reserved for the gateway server so that other applications could not pose as a legitimate gateway server or through the creation of a transfer protocol for the transmission of data via such a system. Both of these are possible solutions. The custom protocol solution, however, requires different request formatting, as exemplified hereinafter:

rstp://domain.com/resource_directory/resource_name-?var=123

(and not http://vertigo/domain.com/resource_directory/resource_name?var=123)

Another way to secure the system is to limit the content delivered via that system to media (music, images, video, etc) and restrict file distribution to content that is not related to the structure and code of a website or application. This way it is more difficult to import malicious code since only media files are permitted. This is done with security in mind. In other words HTML, Javascript, CSS, PHP files etc. . . . cannot be delivered via the gateway server. Another restraint is to have the client (browser) restrict the use of such a gateway or protocol if the website (structure, code and media) is loaded via https, and is sensitive.

Referencing FIG. 1, the reader will consider certain data validity and security aspects according to the present invention. One of the concerns in a data-origin agnostic CDN 144 is the validity of the data. If, for instance, one of the peers has corrupted data, or if someone were to create a malicious peer that registers files that are unrelated to the original data, as a peer cached version of an original file, the reliability and the usefulness of the system can be compromised.

This is why data fragmentation and validation methods must be included for the system to be reliable and useful. Thus, in order to keep a single peer from possibly corrupting or purposefully replacing data in an inappropriate manner, it is preferable to fragment the delivery of the data across multiple peers via certain data delivery fragmentation means. The data delivery fragmentation means according to the present invention may be exemplified by a number of mechanisms. Data delivery fragmentation, for example, can be achieved by breaking the data 199 into packets or sub-streams as at rows 117, 118, 119, and 120. The fragmentation can be optimized to meet the needs of the system.

The fragmentation can be done by simply limiting each peer's delivery to a maximum of an exemplary third or a quarter of a certain media file. This is managed using the Resource Name Server or RNS 4 as discussed in more detail later below. Along with data delivery fragmentation, each data file has with it a validation package for a specific sector of the data as at columns 121, 122, 123, and 124. This is done because every peer that serves data must first cache the media before serving it again. Accordingly, as an example, if the peer delivers data sub stream 117, it would also deliver along with that data a validation package for sector 121 of the file. This validation package is a checksum created by a predetermined algorithm.

Therefore if the peer sending sub-stream 118 were to deliver data that was corrupted or malicious, the receiving peer would be able to detect this by using the validation checksum from the peer sending sub-stream 117 to validate the content delivered by the peer sending sub-stream 118. If the content cannot be validated the peer would send the data request to the original or data origin source. The present invention further contemplates setting a minimum daily threshold of requests, which would enable such peer-to-peer data validation. Otherwise, a validation server would serve the checksums, and these checksums would be created at the first request passed to a gateway server for a resource.

Figure 4:
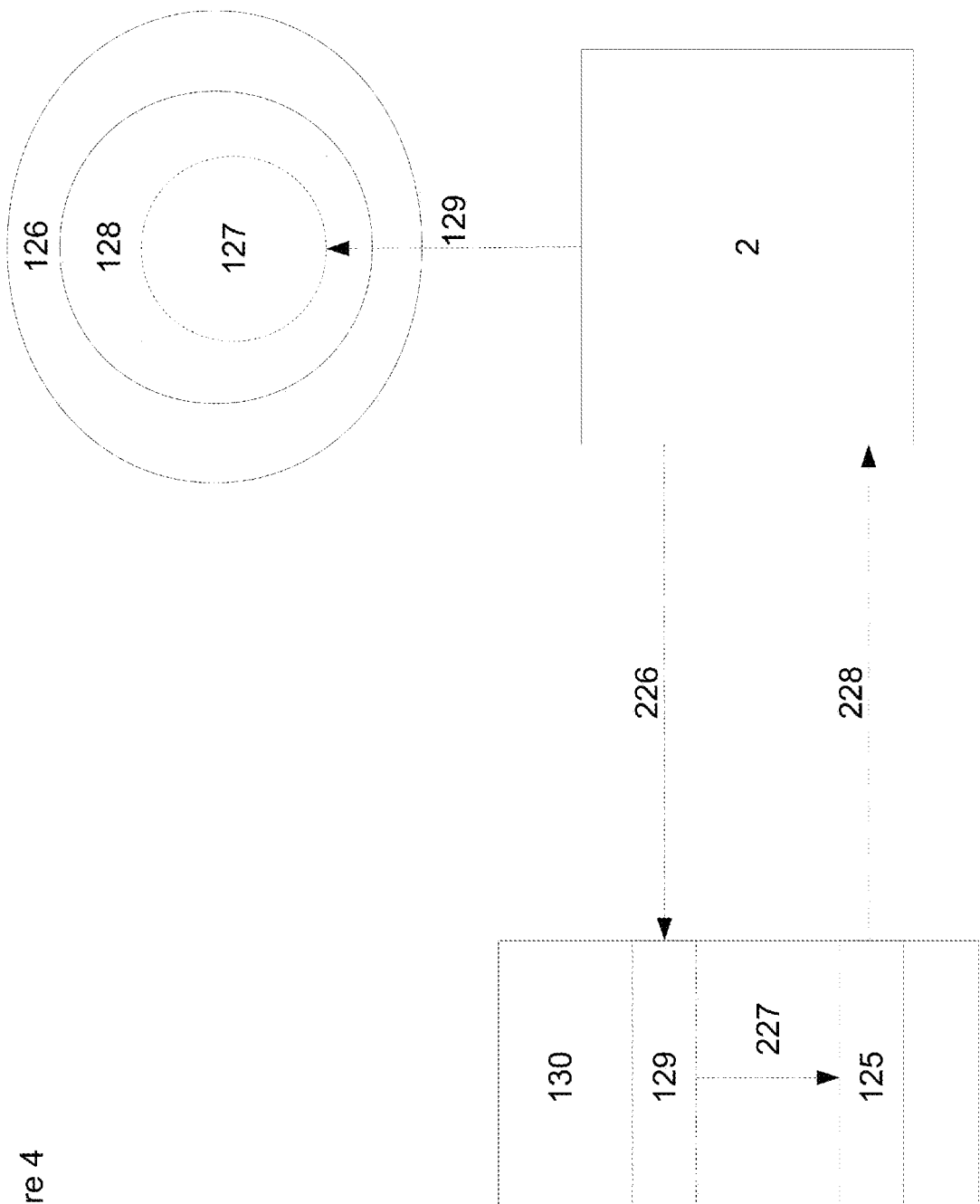
FIG. 4 is a diagrammatic depiction of a domain name server system overview.

Referencing FIGS. 4 and 5, the reader will comparatively consider certain differences between a Domain Name Server (DNS) and a Resource Name Server (RNS). The main difference between a DNS 130 and an RNS 4 is in how a request for a resource is handled. Within DNS 130 a request for a resource (as at 226) is resolved (as at 227) to a domain name 129 or a Start of Authority (SOA) 126 which has the specified resource 127 within a directory 128 of the SOA 126. The client 2 receives (as at 228) the IP address of the SOA from the DNS, and then makes a request (as at 229) for the resource 127 from the SOA 126.

Within a Resource Names Server or RNS 4, the RNS 4 resolves (as at 202) the request (as at 201) for a resource to multiple machines that have the unique resource stored or cached. Accordingly, the IP address of the SOA with the resource can be returned (as at 205) as a valid resource location, but also the IP address for peer cached resources. In other words, within a DNS system a URL is more like the address of a specific resource, within RNS 4, the URL 240 is treated as a unique identification linking a unique resource to multiple locations.

Figure 14:
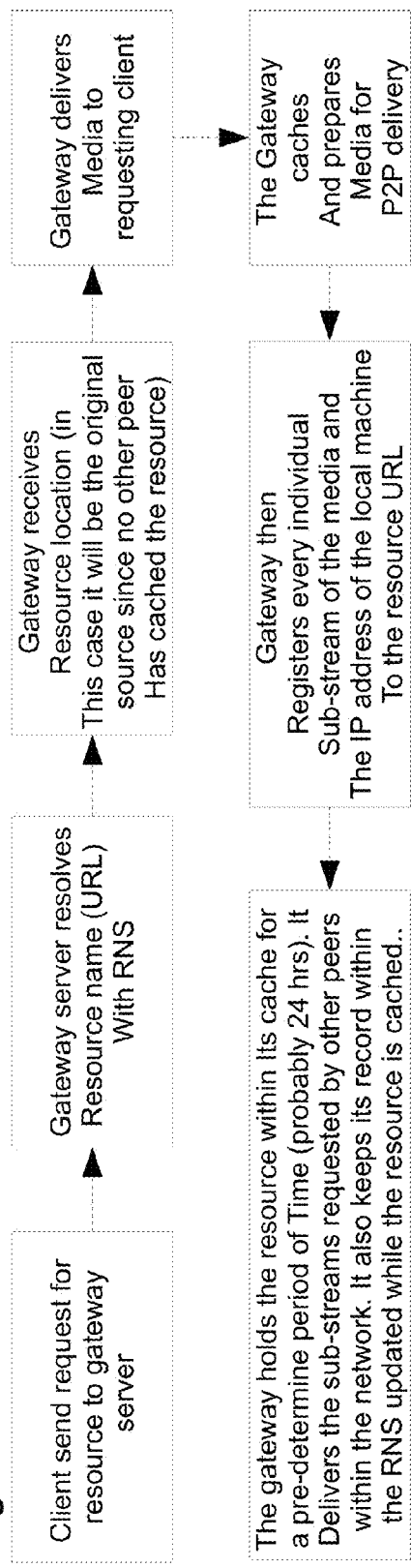
FIG. 14 is a diagrammatic depiction of a resource indexing arrangement with an initial request and no file matching.
Figure 15:
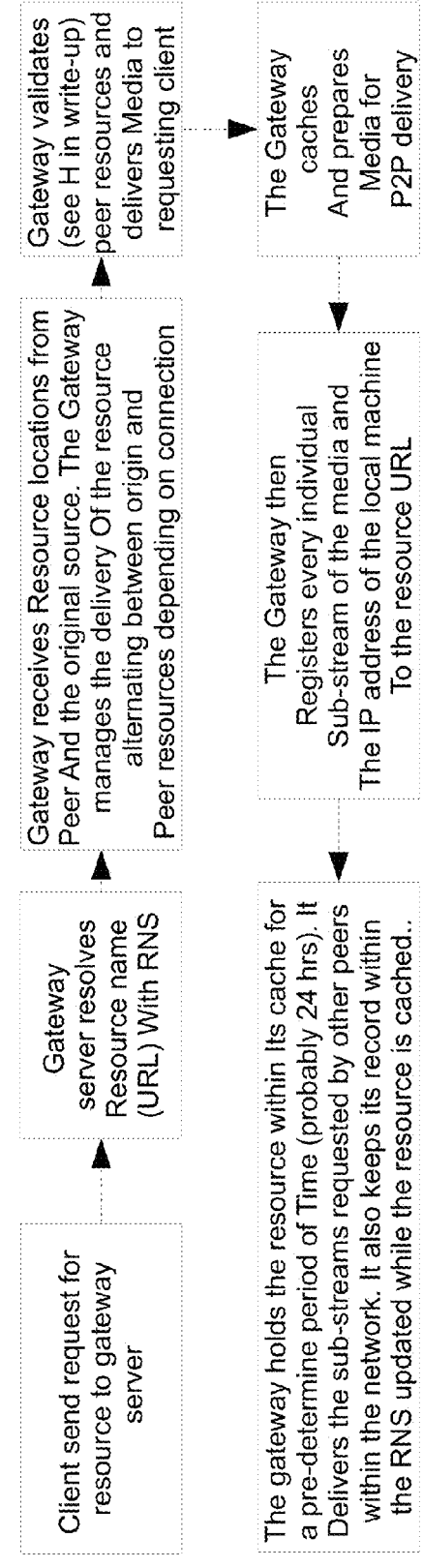
FIG. 15 is a diagrammatic depiction of a resource indexing arrangement with subsequent request and no file matching.
Figure 16:
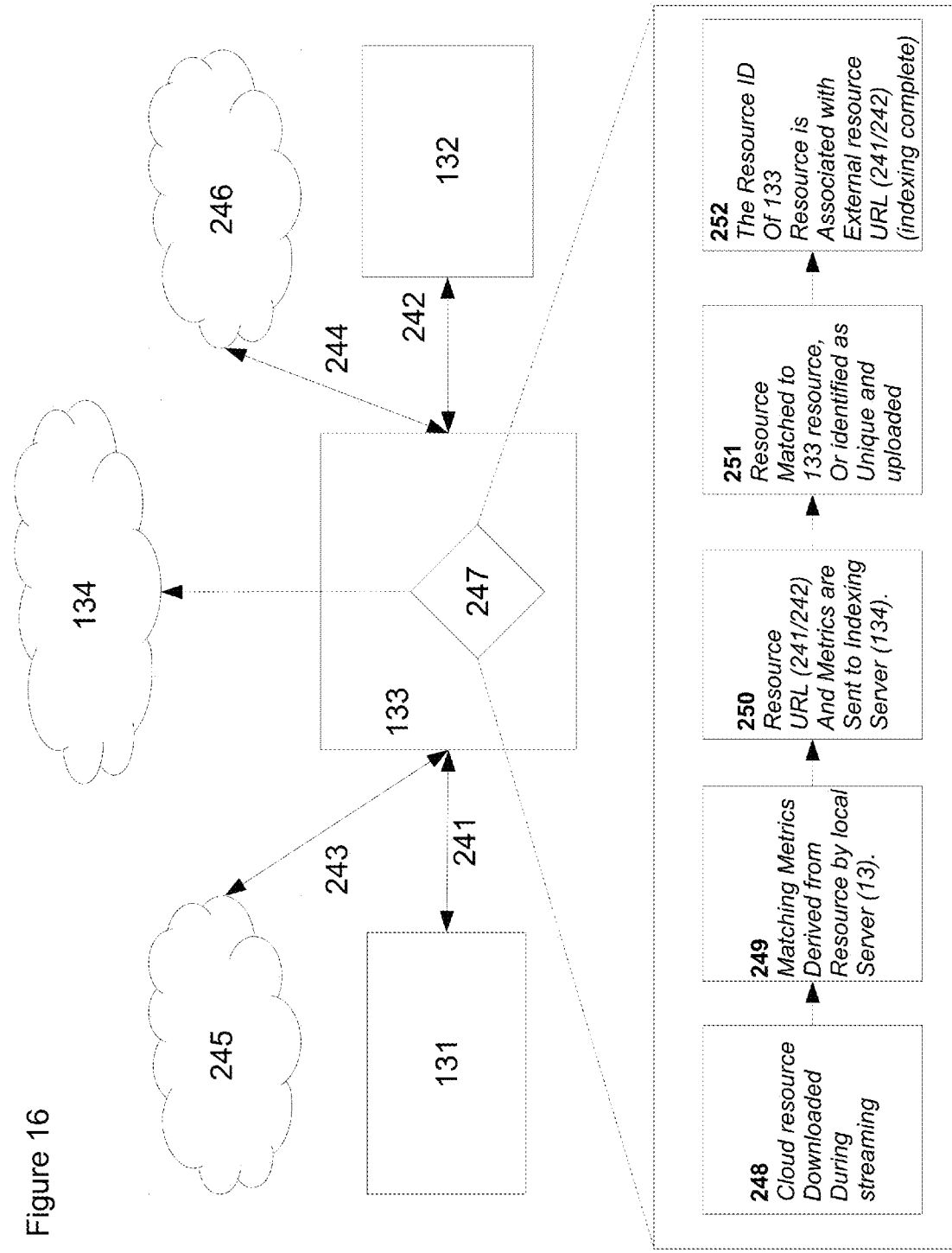
FIG. 16 is a diagrammatic depiction of a progressive cloud indexing arrangement with an initial request.
Figure 17:
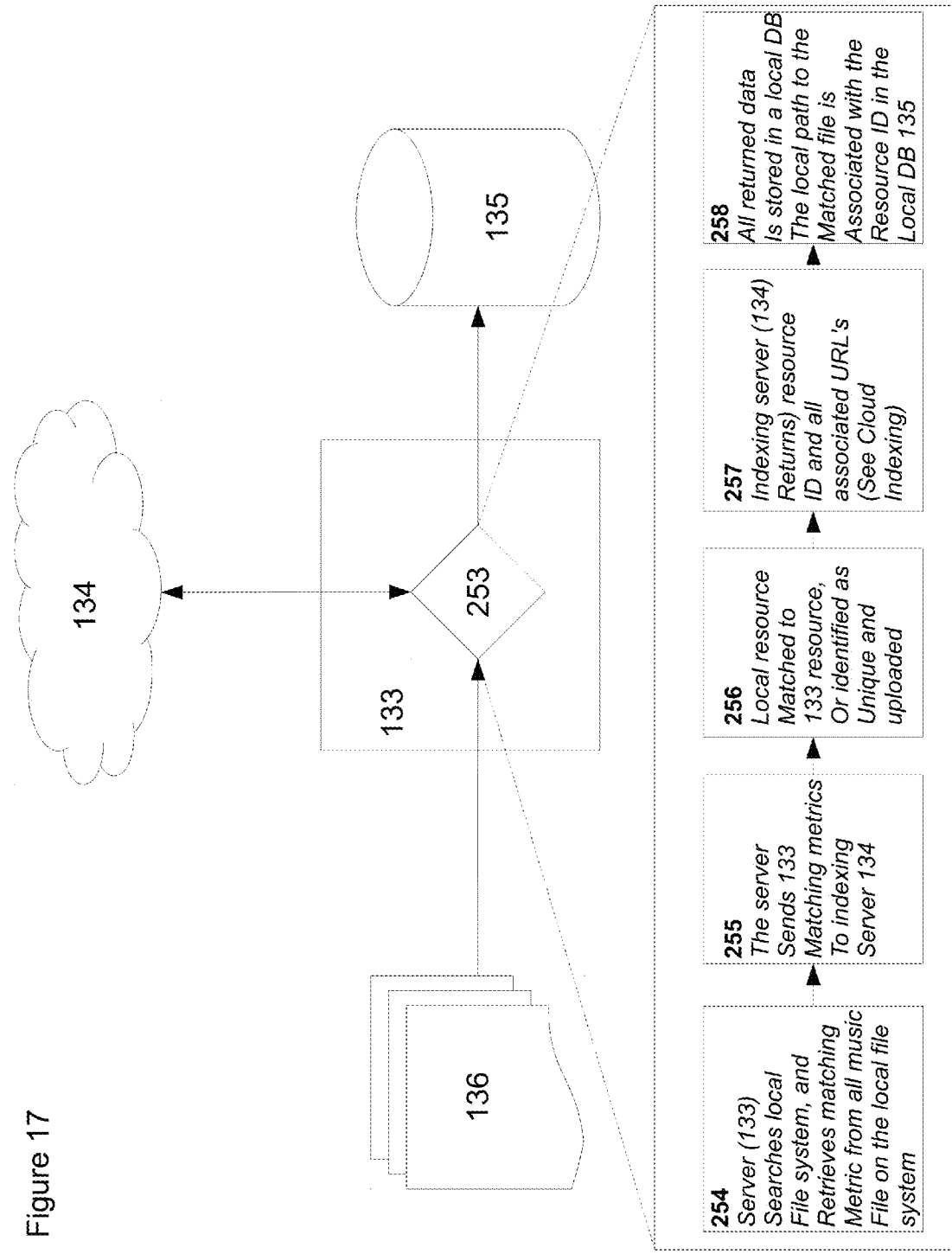
FIG. 17 is a diagrammatic depiction of a local resource indexing arrangement.

Certain means for resource indexing without file matching are depicted in FIGS. 14 and 15; and certain means for resource indexing with file matching are depicted in FIGS. 16 and 17. One of the primary issues that arise when dealing with compliance is how to verify what is being played. Metadata is often corrupted or modified by the user. Therefore to more effectively stream local media, one needs to provide a way to verify with a very high degree of certainty that a media file or song on the local drive corresponds to those stored in the cloud.

This is done by using a metadata-independent file matching system or means, and indexing all local files and matching them with cloud files. There are two sources of files that must be matched against the library according to the present invention, including (1) those originating from other streaming providers or coming in from external clouds and (2) those that are on the local machine.

Referencing FIG. 16, the process of progressive indexing 247 begins with a request that comes in from a 3$^{rd}$ party client application. This can be a stand-alone desktop application as at 131 or a website playing through a browser as at 132. The application 131 or browser 132 passes along as at a properly formatted and valid URL (as at 241 and 242) to the local gateway server (133). The local gateway server 133 uses the URL (as at 241 and 242) to retrieve the requested resource for streaming (as at 243 and 244) from the related clouds 245 and 246 (or related peer-to-peer network, or any possible network based resource). Once the resource has been downloaded for streaming as at 243 and 244, the local server 133 begins the process of indexing as at 247 (with sub-routines 248-252). Local resource indexing 253 is generally depicted in FIG. 17 (with sub-routines 254-258).

Figure 18:
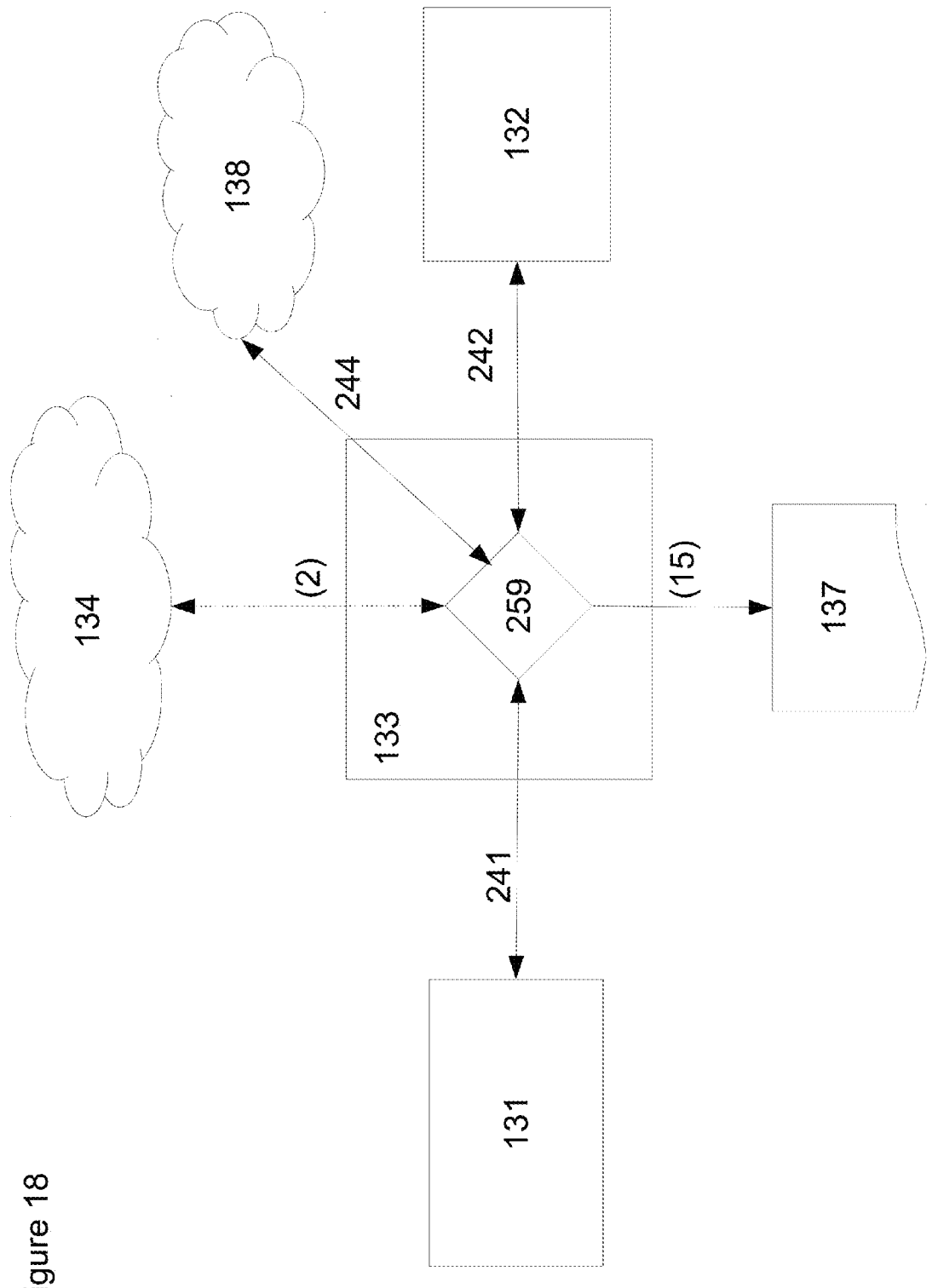
FIG. 18 is a diagrammatic depiction of a first indexed resource request processing arrangement.

Indexed Resource Request Processing 259 is generally depicted in FIG. 18. After a resource has been indexed, the following process occurs when subsequent requests are made from 3$^{rd}$ party clients. Assuming a media streaming service provider (as at 132) puts in a request 242 to the local server 133 using its standard URLs, the request 242 comes in and the local server 133 queries the local file system database 135 and the indexing server 134 to determine if the resource has been previously indexed. (The URL is used to determine if it exists in the indexing server 134 or in the local file system 137). In this case, the local server 133 determines that the resource has been indexed and is available on the peer-to-peer network 138. The media is then retrieved from the peer-to-peer network 138 and served to the media streaming service provider (as at 132) for playback.

In another case, a media streaming service provider (as at 131) makes a similar request using a URL. This time the server 133 determines by querying the local database that indicating that the resource is indexed and associated with a local file 137. The server 133 then serves this file, for example, to a third party cloud-based music streamer (e.g. Spotify) (as at 131). It is likely that systems or applications that access the local gateway server (133) will pass all resources that will be needed during a session when a session starts. The server 133 will then pull the associated fields from the resource indexing server (134). This way all indexed data is stored locally for quick access and routing.

The gateway server according to the present invention provides certain means for both smart routing and royalty reporting for data (e.g. music) transmission. Given that music can be transmitted from multiple sources, the local gateway servers according to the present invention deliver both interactive and non-interactive music requests made by a client application and route the actual transmission from the optimal (e.g. (a) most price efficient or (b) highest sound quality of source) location both bandwidth costs and royalty obligations. Such a system results in a unique Compliance Engine or Compliance Appliance allowing usage reports and royalty obligations to be generated from and across multiple types of service platforms, meeting all rights holder requirements and standards.

Examples of transmission sources include but are not limited to: (1) A cloud-based streamer; (2) A third party cloud-based storage provider who makes data purchases available to the device owner; (3) Vertigo's cloud-based virtual locker (shielded under 512(c) of the Copyright Act); (4) Vertigo-licensed music driven by user/sub-service matched data; (5) locally owned and stored music files available on the listener's device or another owned and qualifying device connected via Wi-Fi; (6) transmission to a mobile device from a linked PC; (7) Peer-to-peer owned files available for transmission and routed in substitution of a file before it is streamed from No. 1, No. 3 and No. 4 listed hereinabove.

Figure 19:
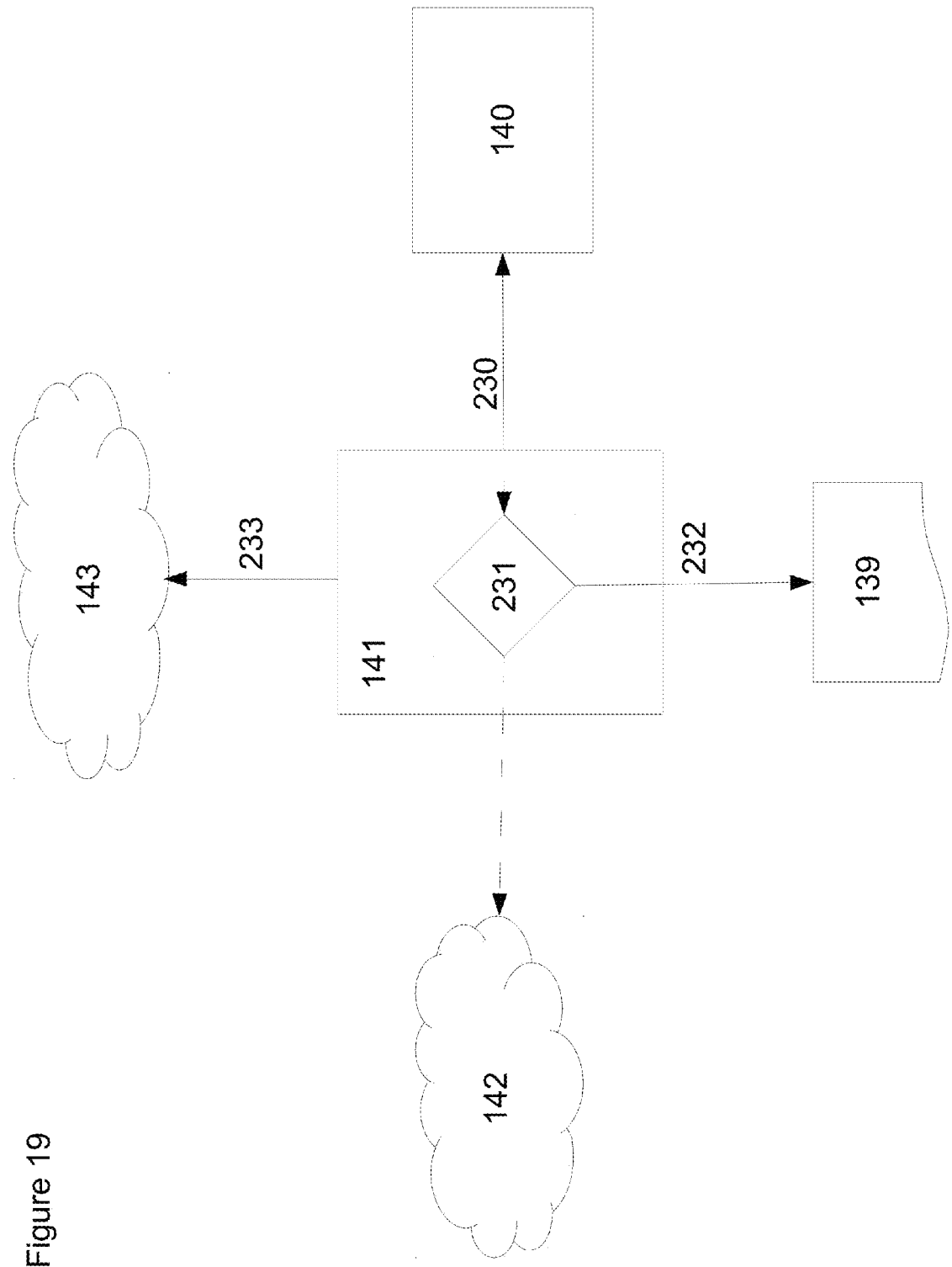
FIG. 19 is a diagrammatic depiction of a second indexed resource request processing arrangement.

A few examples of music routing and route-result reporting are as follows. Referencing FIG. 19, the reader will consider than when a listener is listening to a non-interactive internet radio channel via a related streaming client (as at 140) (e.g. a web-site or stand alone desktop application) and the internet radio service provider is getting ready to stream (as at 230) a file 139 already stored and available on the listener's device, the gateway server 141 according to the present invention matches (as at 231) the indexed local file 139 with the Internet radio service provider's incoming request and streams (as at 232) the file 139 instead of the play from the Internet radio service provider's cloud as at 142.

Notably, all resources, whether local and remote, are indexed which enable quick matching. After streaming 232, the use of the local file is reported as at 233 to the compliance server 143. It is possible that labels could require that the Internet radio service provider pay a small fee when streaming 232 local files 139 since there is no way of guaranteeing that they are not pirated. As a result of the efficient resource allocation according to the server 141, the Internet radio service provider 140 would not have to pay bandwidth or pay for full licensing, and these cost savings can then be passed along to the Internet radio service provider.

Figure 20:
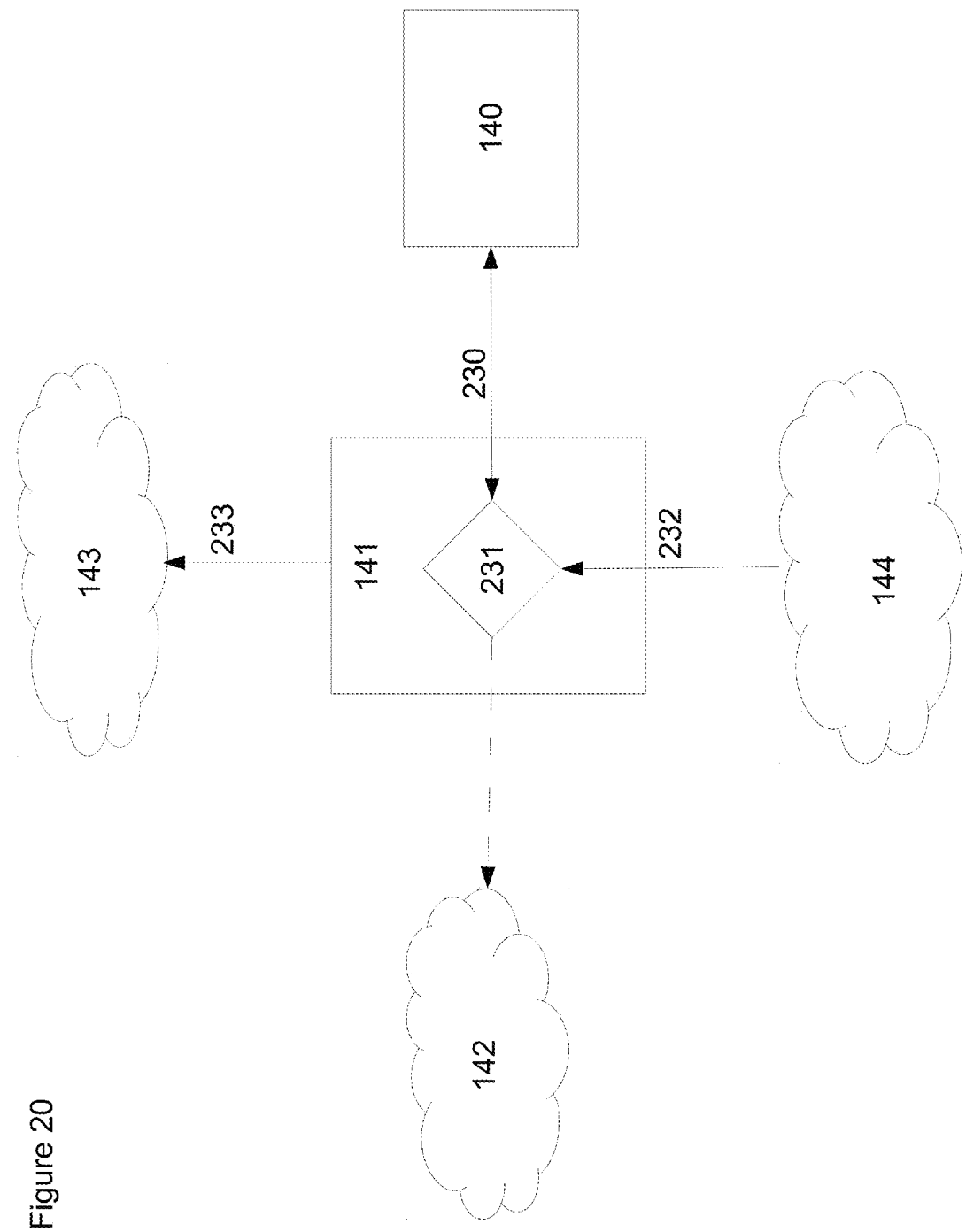
FIG. 20 is a diagrammatic depiction of a third indexed resource request processing arrangement.

FIG. 20 attempts to depict a scenario when a listener is listening to a non-interactive Internet radio service provider channel and the Internet radio service provider client 140 is getting ready to stream (as at 230) a file NOT available on the listener's device, but available on a peer 141 within a peer-to-peer network 144 according to the present invention. There is no royalty savings to the Internet radio service provider but the peer-to-peer network 144 according to the present invention transmits as at 233 the file 139 in substitution of the Internet radio service provider's file at a bandwidth savings to the Internet radio service provider. The server 141 can then report at 233 which song was played to a compliance server 143 if needed.

Figure 21:
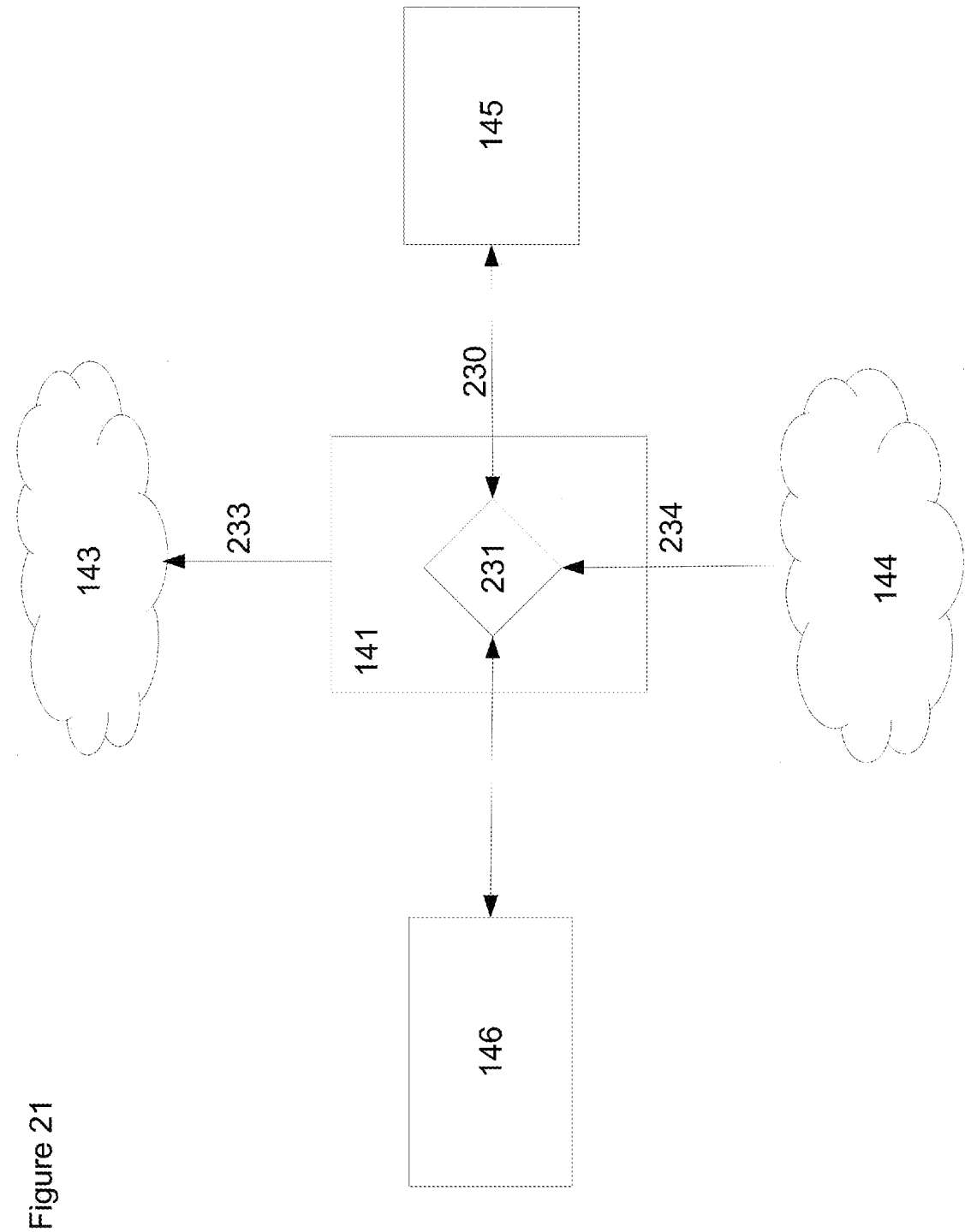
FIG. 21 is a diagrammatic depiction of a fourth indexed resource request processing arrangement.

FIG. 21 attempts to depict the scenario when a listener creates a ten-song playlist in their media streaming service provider account as at 145 for a special event. The listener happens to be a restaurant owner or manager and the event is a public event in a commercial environment. The media streaming service provider account 145 does NOT allow for a commercial environment and while three of the songs are in fact available for download onto the local device via the listener's cloud storage locker, the purchased media license agreement also does not allow for the transmission in a commercial environment.

A commercial licensing provider device 146 is installed on the premises with the legal rights to broadcast all 10 songs but there are only five of the requested playlist of ten songs available on the provider's locally installed device 146. The system according to the present invention synchronizes the playlist made in the media streaming provider's media player 145 and matches (as at 231) the missing files to files available in the Vertigo cloud and transmits 234 the songs to the commercial licensing provider's device 146 per the provider's licensing agreement. This transfer can come from Vertigo's peer-to-peer network 144 depending on bandwidth costs. All transmission and streaming can be reported 233 by the server 141 (if needed) to a compliance server 143 to track the number of times a song was played.

Figure 24:
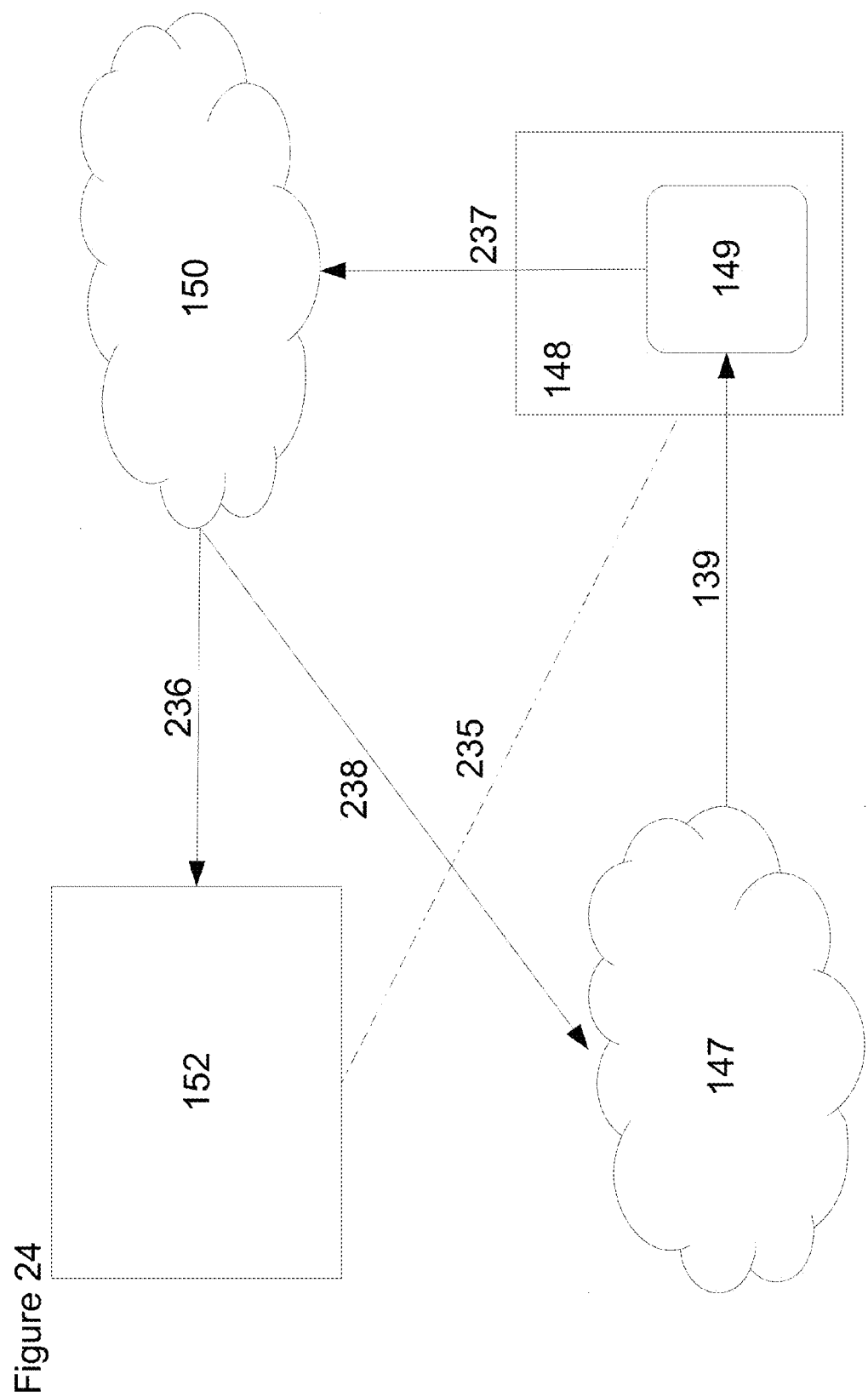
FIG. 24 is a first diagrammatic depiction of a streaming provider requesting that a song be played on a mobile device according to the present invention.

In the scenario depicted in FIG. 24, a streaming provider 147 requests that a song 151 be played on a mobile device 148. The request is sent from a mobile device application 149 on the mobile device 148, and sent to remote server 150 according to the present invention. If the mobile device 148 requesting 237 the song is linked as at 235 to a personal computer 152 that has the file stored locally, instead of routing the request for the song to the data origin server 147 (i.e. the server of the streaming provider), the request is sent to the personal computer 152 and streamed as at 236 from the personal computer 152 to the mobile device 148. In such a situation no additional streaming rights would be required and no bandwidth cost incurred. If the request 237 is sent to the remote server 150 according to the present invention, and the file does not exist on either a linked personal computer 152 or cloud, the request 237 is sent as at 238 to the data origin 147 which data origin 147 can then stream 239 the file to the device 148.

Figure 25:
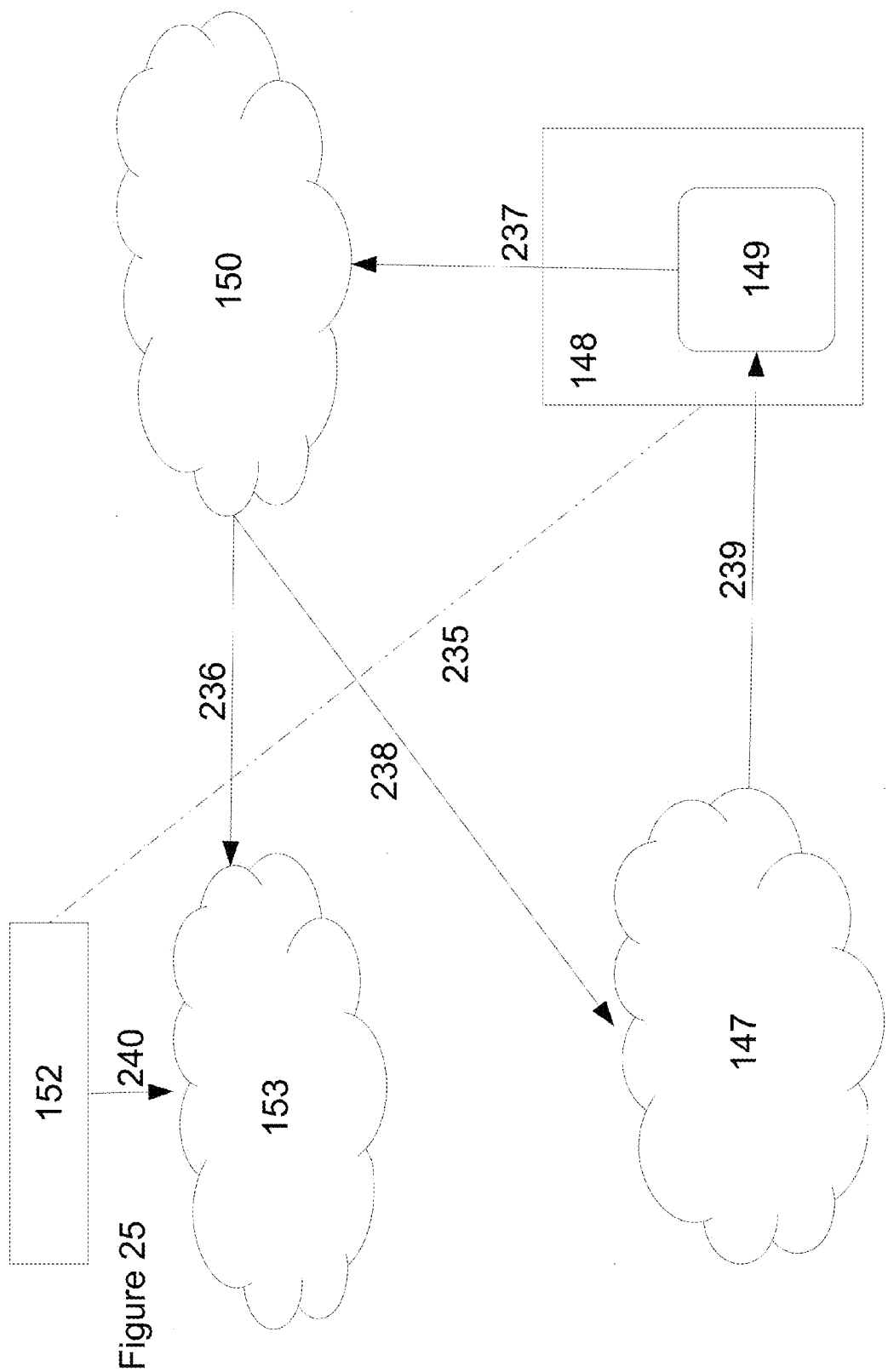
FIG. 25 is a second diagrammatic depiction of a streaming provider requesting that a song be played on a mobile device according to the present invention.
Figure 26:
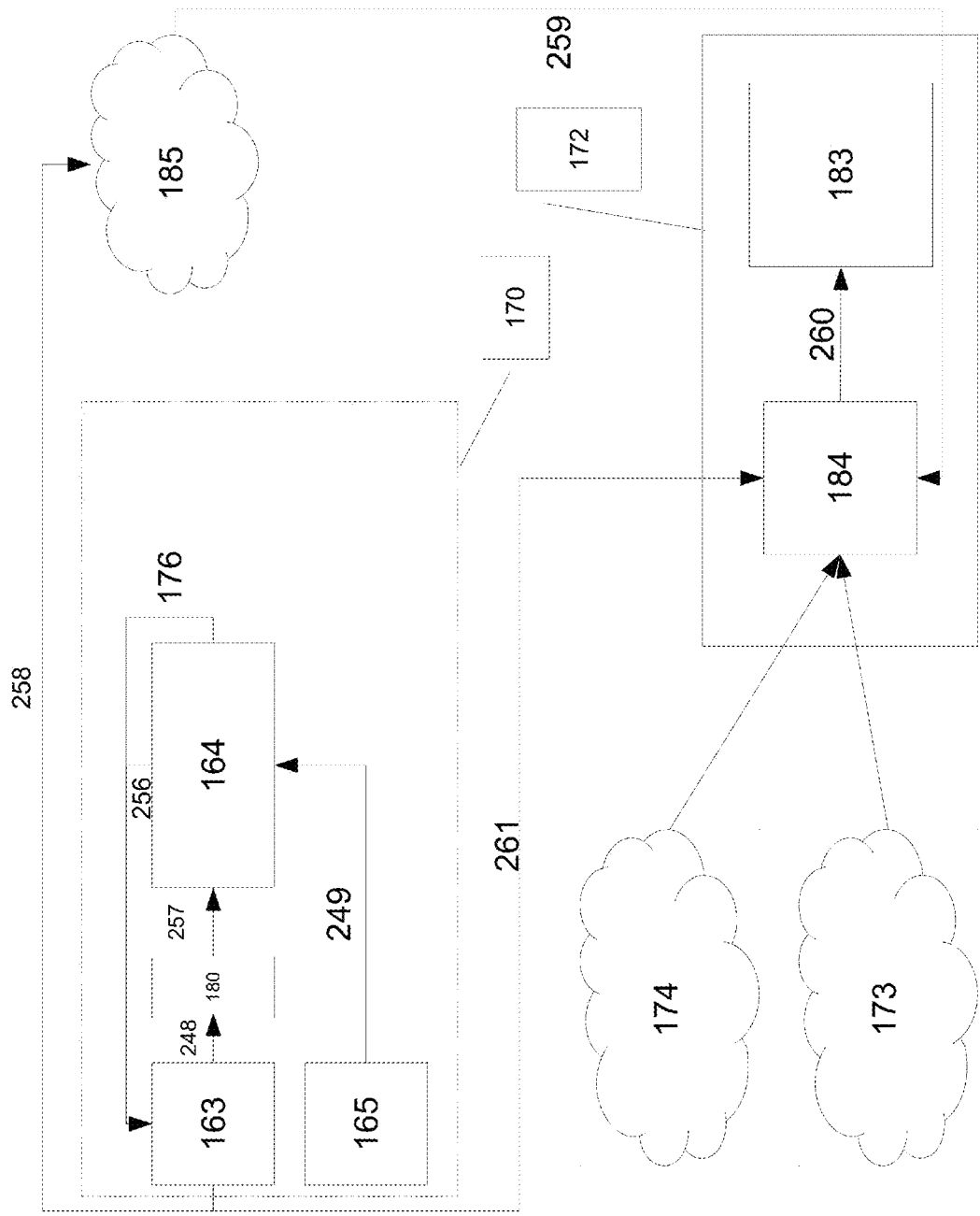
FIG. 26 is a diagrammatic depiction of a gateway server enhanced system overview according to the present invention.
Figure 27:
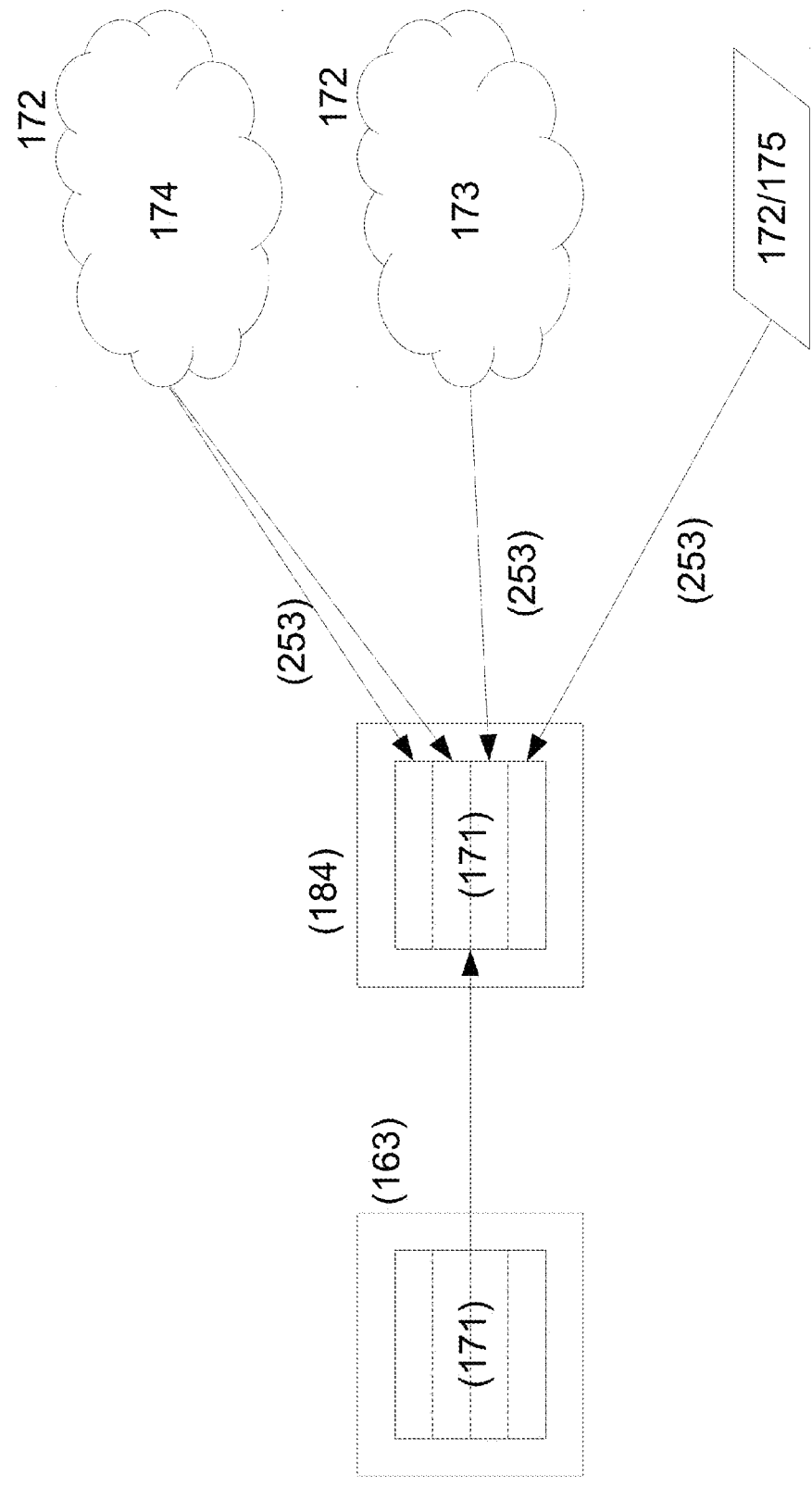
FIG. 27 is a diagrammatic depiction of a pre-recorded media queue arrangement according to the present invention.
Figure 28:
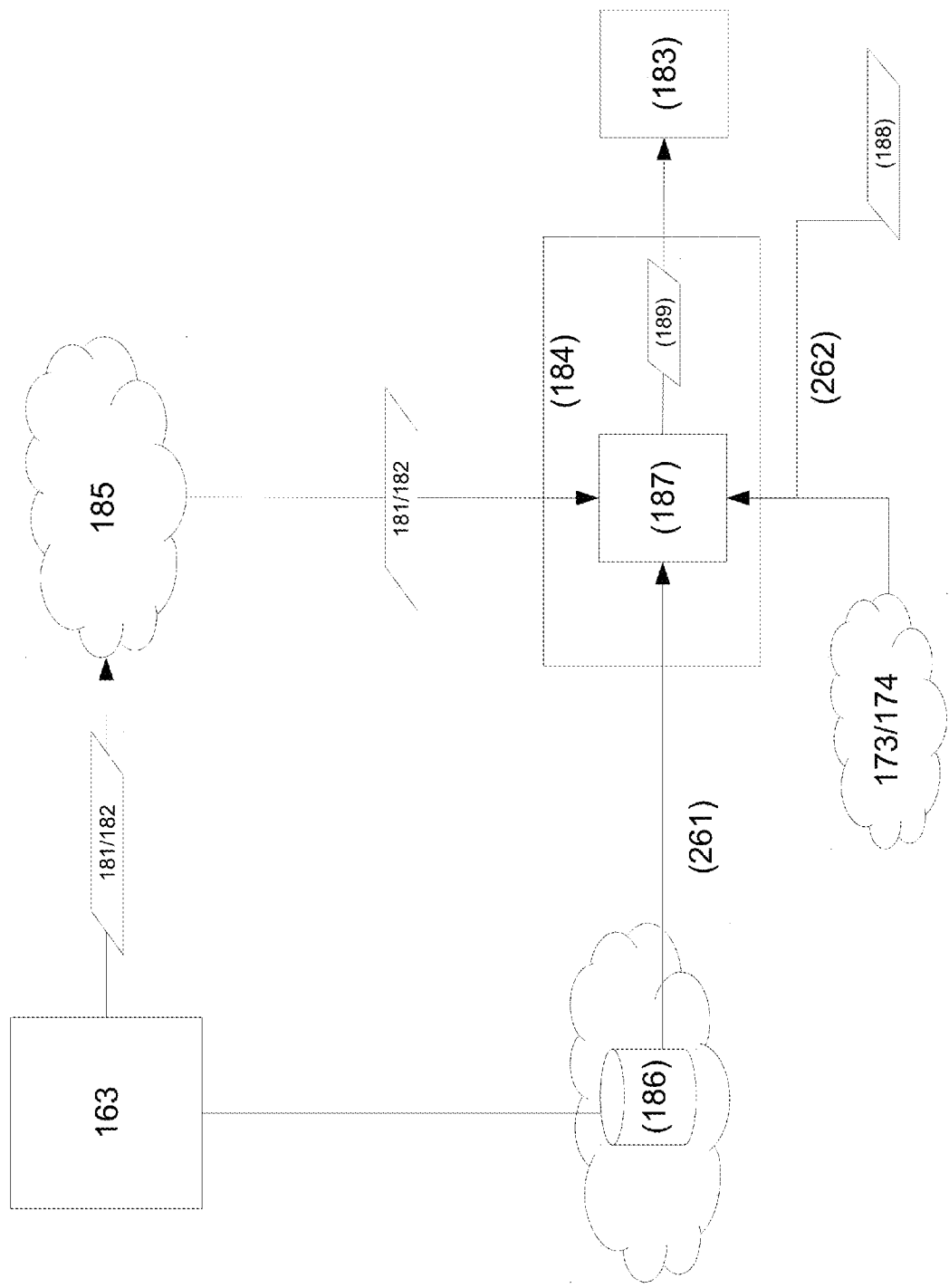
FIG. 28 is a diagrammatic depiction of a stream splitting arrangement according to the present invention.
Figure 29:
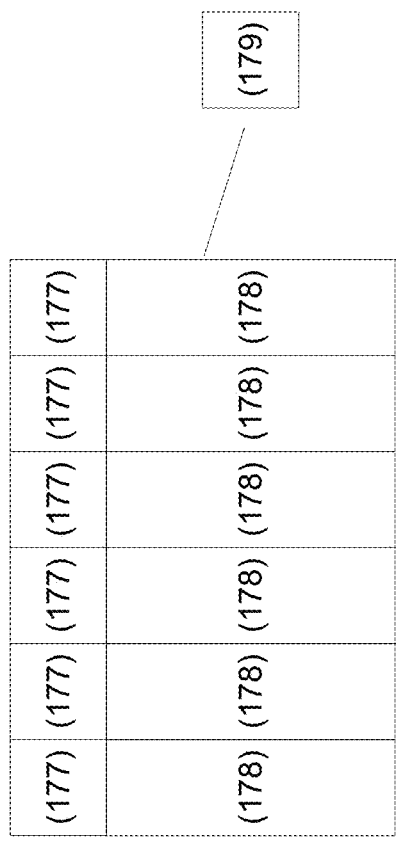
FIG. 29 is a diagrammatic depiction of a MP3 file structure according to the present invention showing frame headers and audio frames of an audio stream.

In the scenario depicted in FIG. 25, a streaming provider 147 requests that a song be played on a mobile device 148. The request is sent from the mobile application 149 on the mobile device 148 and sent to remote server 150 according to the present invention. If the mobile device 148 is requesting a song that was uploaded as at 240 to a cloud service 153 from a personal computer 152 to which the mobile device 148 is linked as at 235, the remote server 150 routes 236 the request 237 to the cloud locker or service 153. In this case no licensing is required, but bandwidth charges would apply. If the request 237 is sent to the remote server 150 according to the present invention, and the file does not exist on either a linked personal computer 152 or linked cloud 153, the request is sent as at 238 to the data origin 147, whereafter the file may be streamed as at 239 to the device 148.

The server 150 according to the present invention, and its smart music routing engine as described within the foregoing examples not only selects the song from the least expensive point of transmission with regard to bandwidth and royalty costs including but not limited to resources such as Example Nos. 1-6 above, but has also evaluated the compliance aspects of such a transmission and reports such activity for royalty purposes.

Figure 22:
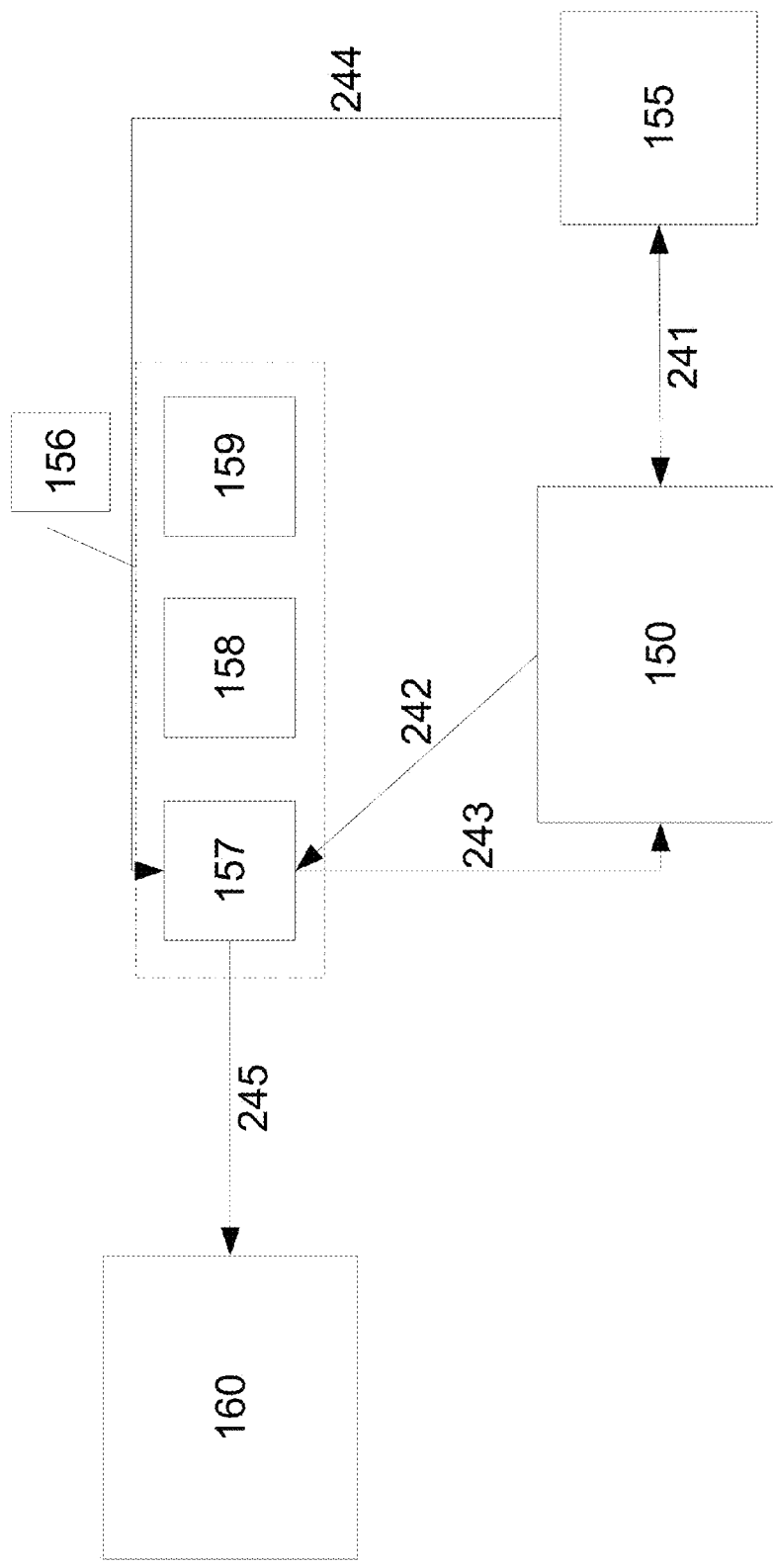
FIG. 22 is a diagrammatic depiction of a sub-licensing, cloud delivery arrangement.
Figure 23:
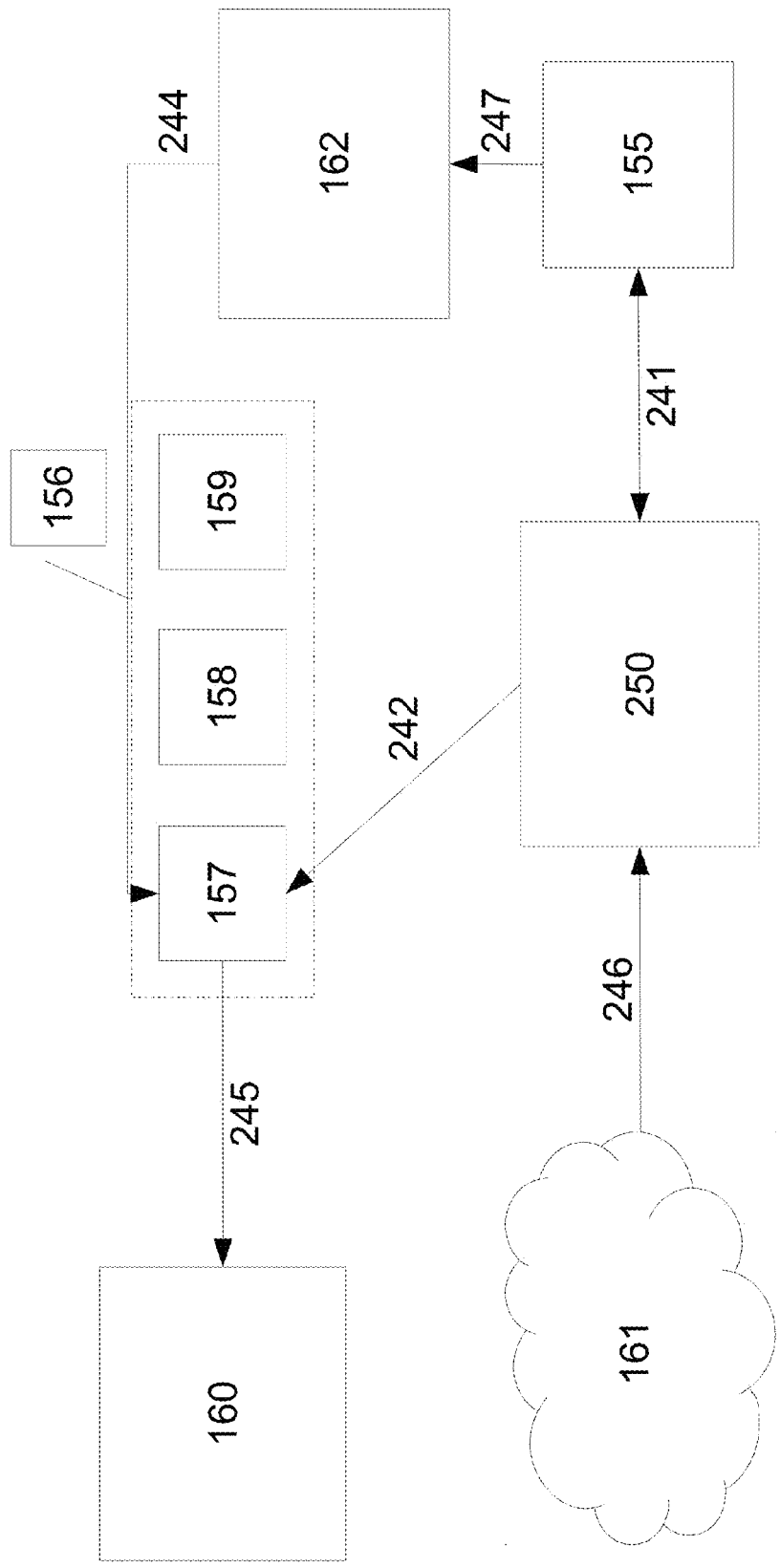
FIG. 23 is a diagrammatic depiction of a sub-licensing, peer-to-peer delivery arrangement.

Referencing FIGS. 22 and 23, the reader will consider certain sub-licensing arrangements according to the present invention. The use of the local gateway server for automated sub-licensing of streamed content is dependent on the terms of agreements between right holders and content deliverers (i.e. streaming service providers). Described below is a situation that is possible given that the streaming provider has an agreement that requires that they share a portion of revenue derived from streaming licensed media. There may be a requirement that such a license specifically allow the streaming provider to act as a wholesaler.

A first case scenario is depicted in FIG. 22. In this case a streaming service provider 155 passes a request to the local gateway server 150 along with the request that the provider 155 must set certain parameters allowing the local server 150 to stream 241 at an optimal price. This would indicate that the server 150 may stream from a sublicensed account as at 156. In the diagram there are three sub-licensed accounts referenced at 157, 158, and 159.

When the request comes in from the client application 155, the local server 150 determines as at 242 which sub-licensing account (as selected from accounts 157-159) has the optimal licensing cost for the given request 241. The song is then streamed 243 from the sub-licensors cloud (e.g. from account 157). The streaming provider is then billed as at 244 on behalf of sub-licensor 157. The billing would include licensing costs and streaming costs based on the sub-licensors licensing agreement. The sub licensor then pays 245 the rights holder 160 the royalties and keeps monies necessary to cover the cost of streaming and profit derived from the transaction.

In a second case as depicted in FIG. 23, the primary difference is seen in how the cost of streaming is covered. Since the data is streamed 246 from a peer-to-peer network 161 according to the present invention, the fee associated with using the peer-to-peer network 161 is paid 247 to the service provider 162 owning the network 161 and then the costs of licensing are passed along 244 to the sub-licensor 157 who then pays 245 the royalties to the rights holder 160 and retains the profit derived from the transaction.

The sub licensing cases above are possible because the local server 150 tracks and reports streams, namely, who streams from where (which sub licensor) and as a result can properly route royalty payments. The uniqueness of the system is not that is allows for such tracking, but that it is possible to access a peer-to-peer network and still report such usage. The second case scenario presented above is only possible with a local gateway server 150, while the first scenario can happen with a standard server to server request, or some form of rewrite or redirect.

Certain licensing benefits/advantages by using local server content are evident according to the present invention. In this regard, a local media use comes into play when a song exists on a local server controlled or owned by the end user of the service. This would be a title or album already in the user's personal media library account or any part of their local computer. This content could have been placed there by purchase, download or gift. It is not the responsibility of the service provider or the owners of the present system/methodology to confirm the legal sourcing of the local files on an end user's computer.

The streaming provider will not be making a duplication, distribution or performance of a locally controlled sound recording or musical work. Therefore, no rights are used and no additional license fee is needed for calculation or reporting. The key is being able to quickly and accurately identify these tracks as to not interrupt the end user's experience.

The use of media from a server according to the present invention happens when a song that has been licensed at a more favorable rate from the owner's of the present system/methodology can be used in the place of a song from the streaming provider. This is made possible by licenses that are made directly with content controllers. These new direct agreements offer a more transparent royalty structure and reporting process directly to the artist.

The direct licenses also take into account both interactive and non-interactive uses creating more of a "one-stop" relationship for online usage. The agreement will also offer a unique royalty payment that is calculated by the savings gained from delivery efficiencies. There are currently no agreements that pass a portion of the savings created by shared files back to the industry.

The benefit of using these files to the streaming providers comes from the reduced royalty rate across interactive and non-interactive usage. All performances and listening hours calculated from the use of these titles will be carved out of the standard "full-rate" royalty calculations and will be based on the more favorable rate.

The use of controlled peer-to-peer media happens when a file is located within the controlled user server's secure cache and can replace a file scheduled to play per the streaming providers data feed. While there is no cost savings from the royalty fees there is a delivery savings that will intern benefit the artists that are under the direct licenses according to the present system and methodology. Therefore, the more titles that can come from this secure cache the more benefit to both the streaming providers and music industry.

Below is a breakout of a sample month of programming from a fictitious streaming provider. The breakout is meant to show not only the savings involved with the use of the multi-sourced content but also how critical the unique compliance calculation process is to the overall savings process. The compliance engine and reporting tool with have the ability to pull the following information:

1) Usage reports based on the unique specifications required by all Performing Rights Organizations. These specifications include the following items.
    a. Provide unique reports per platform (Stream Provider)
    b. Provide ability for revenue information to be securely entered based on platform type and per Streaming Provider
    c. Usage reports per unique user session to create Average Listening Hour totals, Per play totals, and per listening session totals
    d. Ability to aggregate all usage and revenue information into separate usage reports per SP per PRO
2) Usage specifications for Sound Exchange reporting and payments
    a. Provide unique reports per platform (Stream Provider)
    b. Provide ability for revenue information to be securely entered based on platform type and per Streaming Provider
    c. Usage reports per unique user session to create Average Listening Hour totals, Per play totals, and per listening session totals
    d. Ability to aggregate all usage and revenue information into separate usage reports per SP
3) General usage specification for Record Labels and Publishers—Used for Interactive uses.
4) Rights Module "Compliance Dashboard"—Ability to batch change or individually change (per media asset) rights, royalty rate, clearance status and uses granted by content controller for various agreement types:
    a. Record Label License Agreement
    b. Residential License Agreement
    c. Commercial License Agreement
    d. Multiple Platform License Agreement
    e. Bundled Rights Agreement
    f. Royalty Sharing Agreement (Publishing Administration)
    g. Waiver/gratis
5) Ability to provide individual and aggregated account of all report requirements above across all separate platforms and services for the each of the following "Content Source Types"
    a. 100% Streaming Provider (SP) Content
    b. Local Server Content
    c. Controlled P2P Content
    d. Vertigo Licensed Content
6) Royalty Calculation Engine—The system has the ability to calculate royalties owed by combining the usage data per date range, content source type and Streaming Provider based on rates entered into the Compliance Dashboard. The following calculation will be used for local server content carve outs. X/X+Y×(per play or streaming hour rate)=total royalty. X=Local Server Content and Y=Streaming Provider Content The ability to accurately calculate and report for all rights societies, store, source, and calculate controlled and proprietary content uses, and incorporate delivery cost savings into the total overall royalty make this a one of a kind compliance service.

This portion of the document discloses how the local gateway server could be used to make traditional radio stations Internet streams more efficient and increase the quality of the streamed audio. The invention or rather this portion of the disclosure is focused on radio broadcasts which primarily play music as opposed to talk shows, sport broadcasts etc. . . . Significant savings can be derived and the quality of the audio can be significantly improved due to the fact that music based radio broadcast are a mix of live audio and pre-recorded audio.

Significant saving and increases in audio quality can be achieved if the pre-recorded audio can be separated from the live audio or studio mix and delivered to the local computer via a peer to peer network or through local file systems (a metadata file matching system would be used to ensure that the proper song is played). The pre-recorded audio and the studio mix could then be mixed on the local computer to ensure consistent broadcast content and quality. The disclosure will explain how this can be achieved.

Figure 30:
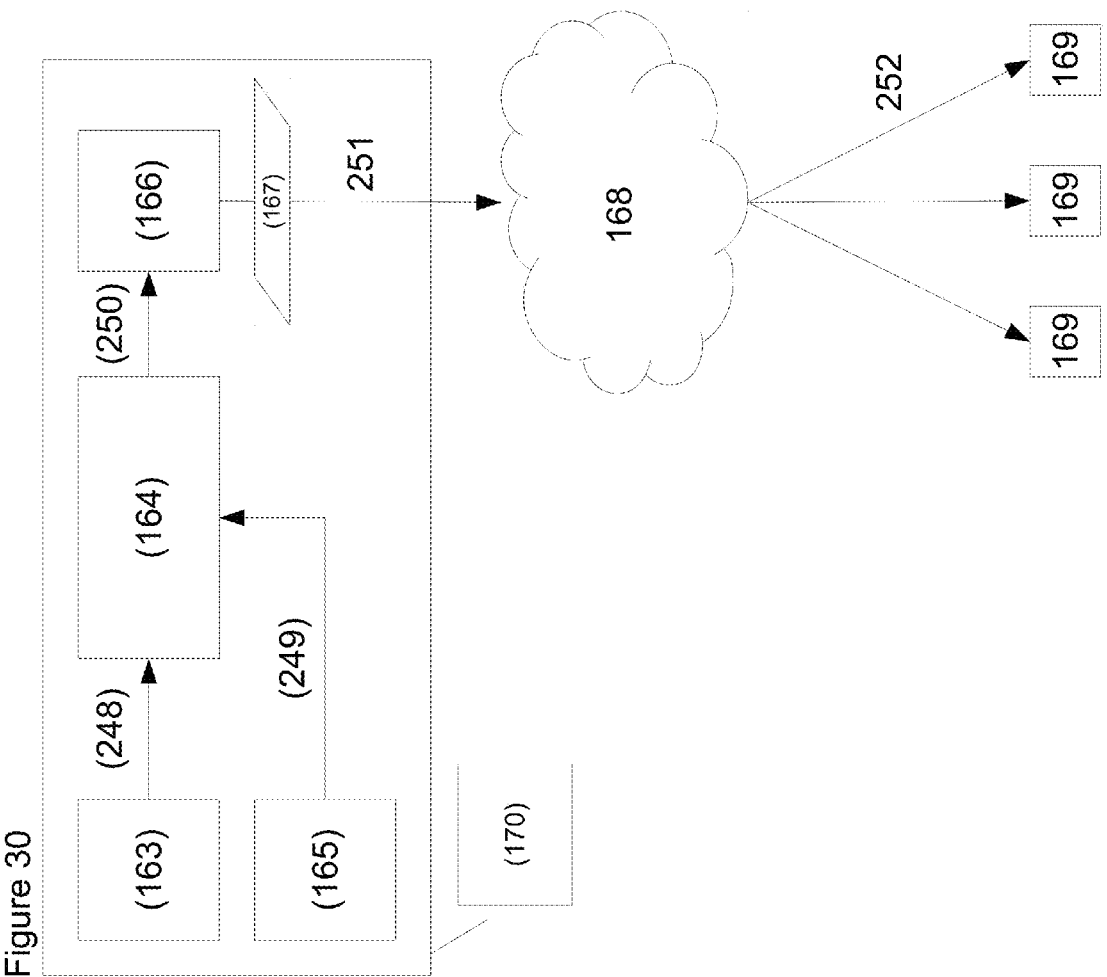
FIG. 30 is a diagrammatic depiction of state of the art methods for streaming radio over the Internet.

Existing methods for streaming radio via the Internet are generally depicted in FIG. 30. Current methods for delivering radio streams via the Internet typically involve the use of a media playing device as at 163 (e.g. typically a personal computer) which plays pre-recorded audio (music tracks, advertisements, etc. . . . ) and outputs 248 the audio to a soundboard 164. This audio is then mixed with the disc jockey's remarks and/or commentary and other live audio 165 that is input 249 into the soundboard 164 all at a studio or recording system 170.

The soundboard mix is then output as at 250 to a computer 166 as a single stream of audio. The computer 166 then compress the audio stream and outputs the audio stream to a compressed audio file 167 (this is usually an MP3 file). This MP3 file does not have a set duration as the file is live streamed and new data is being appended to the end of the file constantly. This MP3 file is typically located on a content delivery network 168 and the computer 166 that compresses and trans-codes the audio stream appends 251 this file with new data as it compresses it. The content delivery network 168 then distributes 252 this file to clients 169. Again this is a simple system overview and is likely similar to most configurations on the market.

The gateway server enhanced system according to the present invention is generally depicted in FIGS. 26-29. The enhanced system begins in a radio studio 170 and a computer 163 that output 248 pre-recorded audio to a soundboard 164. The computer 163 according to the present invention would have certain event marker association means as exemplified by proprietary software, which when installed or applied allows . . . .

1. A disc jockey to queue songs for a broadcast; the software creates a song queue 171 that is then distributed to clients 172, which clients 172 stream the broadcast. The queue 171 contains songs, which the disc jockey plans to play during the broadcast. The local server 184 pre-loads 253 these songs so that when the disc jockey decides to play a song, the song will be available at the client 172 for play back. These songs can be delivered via a remote content delivery network client 173, a peer-to-peer network client 174 or matched and streamed from a local file system 175.
2. The software also compresses as at 256 the audio output 176 returning from the soundboard 164. The software also imbeds event markers in the frame headers 177 of the audio stream 179. Each MP3 audio stream/file 179 consists of audio frames 178, which audio frames 178 each have a header 177. As new audio is added, new frames 178 are appended to the file. These headers 177 are 32 bits long. Within each header 177 there is a bit reserved for private application use. This bit would be set to "1" at the start of an event, and set to "0" during regular streaming. This data would be embedded into both streams 176 and/or 256 coming from the soundboard 164. Each header 177 also contains bits that are informational only and do not affect audio playback (e.g. "copyright", "original"). Each header 177 has at least 3 bits (including the private bit) which would not affect audio play-back. These bits could be used to create an event ID. The ID would be created by using these bits (following an event indicator bit) to create a combination of "0" and "1" to allow for enough unique ID's to accommodate enough events to fill 10 seconds of play-back. Thus, if the frame header with the original even indicator bit is used along with the frame header directly following are used at total of at least 5 bits could be used to create at least 32 or $2^5$ unique markers. This should be more than enough unique markers to cover enough events for a possible 10-second lag. If more markers are need, another header can be added to increase the total to 256 from 32. Since each event will have a unique marker within a 10 second time frame, these markers can be used to synchronize two separate streams (one which contains live audio only and the other which would be the full mix) to hand off and transition to a fully remotely mixed stream and a locally mixed stream (which would be a stream of live audio streamed from the studio and pre-recorded audio mixed into the stream at event markers by the local server). The event markers would also link to mixing instructions to mimic the audio mix from the studio.
3. The application also creates an events queue. This would be a queue of events which will be matched to event markers based on the unique bit ID following the marker (as explained above). These events would be recorded on the computer 163 which is compressing the audio, so that each event is registered at the exact frame 178 in which they occur, ensure that the timing of the events is embedded into the live audio stream 256 at the exact place they occur in the original studio mix 176. These events will contain information on
   a. What pre-recorded audio needs to be played at the event marker.
   b. At which frame playback begins for the pre-recorded audio.
   c. At which Volume playback should begin.
   d. And if the volume was being faded in, an equation that best fits the direction and the slope of volume fade in/out. This will be used to mimic studio fade in/out. This information could possibly be recorded by a peripheral fader 180 that allows the disc jockey to control 257 the audio as it is output to the sound board 164 and report the changes in volume back to the computer 163.
   e. The end of the event (this is typically required to mark when fade in/out stops).
   f. And more . . . This is just an example of the most likely type of events.
4. The application would also update 258 the live audio stream file 181 and the full mix file 182 on the remote server or content delivery network 150.

Once the two streams 181/182 are recorded and encoded by the application within the studio 170 on computer 163, both the files 181/182 are uploaded 258 to a content delivery network or a remote server 185 for delivery 259 to clients 172. Client sided applications 183 (e.g. browsers, etc. . . . ) send requests for the radio stream by using a properly formatted URL. The URL is structured as a sub-domain of the primary domain name, for instance a URL of this format could possibly be used to reference a radio station stream radiostation.vertigomusic.com/[show id]. If the vertigo gateway server 184 has not been installed, this URL would refer the client to the fully mixed studio stream 182 and would play the file in the same manner as a traditional Internet radio stream (see above and FIG. 30).

If a vertigo gateway server 184 has been installed, the server 184 registers that sub-domain name to itself and then handles all request to the sub-domain name from the local client application 183. In this case when a request for the stream is made by a client application 183, the request is served 260 by the gateway server 184. The gateway server 184 begins by serving the fully mixed stream 182 from the remote content delivery network 185. Once the stream begins the gateway server 184 requests the pre-recorded audio queue 171 and begins caching 253 the pre-recorded audio from peer-to-peer 174, remote content delivery network(s) 173, or local sources 175. The gateway server 184 also loads 261 the events queue from a remote database 186, which is constantly updated by the studio computer 163. The gateway 184 would consistently receive updates of events 261 while the stream 181 is live.

In order to transition from the full studio mix 182 to the live audio only stream 181, the gateway server 184 loads both streams 181 and 182 and only serves the full mix 182. In order to ensure that the gateway server 184 and the mixing application 187 have enough time to complete all tasks, the server 184 starts the stream 10-20 seconds from live data reception, creating a custom lag which would be used to create time for the system to execute the mixing and transition. The gateway server 184 waits for an event bit in the full studio mix 182 frame headers 177 to transition to the live audio stream 181.

The gateway server 184 aligns the two streams 182/181 at the event bit. This is done by matching the bit code following the event bit. If the bit code matches for both events, the events are considered matched, since only the last 10-15 seconds of a stream are searched. The 32 unique bit codes provide enough uniqueness to guarantee that the matched events are in fact identical. Once event bits are matched, the gateway server 184 transitions from the full studio mix 182 to the live audio mix 181 at the frame 178 in which the event bit occurs. Using this method provides a seamless transition from stream to stream with frame-to-frame accuracy.

Once the gateway server 184 has transitioned to the live audio only stream 181, it begins to follow the mixing instructions that are stored in the events database 186 when an event bit appears. Since only the last 10-15 seconds of the live stream are tracked for event bits, the bit code is used to locate the event data within the database 186 that matches the event bit code.

Thus, assuming the first event was for playback of the first song within the pre-recorded audio queue 171, the application will already have cached at least 10-20% of the audio. In this case, the gateway server 184 passes the live audio stream 181 and the pre-recorded audio data 188 to an internal mixing application 187 (this can be a command line application like SoX or a custom built application).

The gateway server 184 also sends 261 the mixing data to the application which mixes live audio stream 181 and the pre-recorded audio to mimic the full studio mix 182. This is done by using the data that is recorded at the studio 170 and associated with an event to mimic the disc jockey's fading and timing. The application 187 then outputs a new locally mixed file 189 which is then served to requesting client 183. This can all be done seamlessly because the server can create a significant lag between live data transmission and serving data to the client application. As long as this lag is create at the outset of serving the audio this lag timeframe can be used to mix and prepare the audio.

Figure 31:
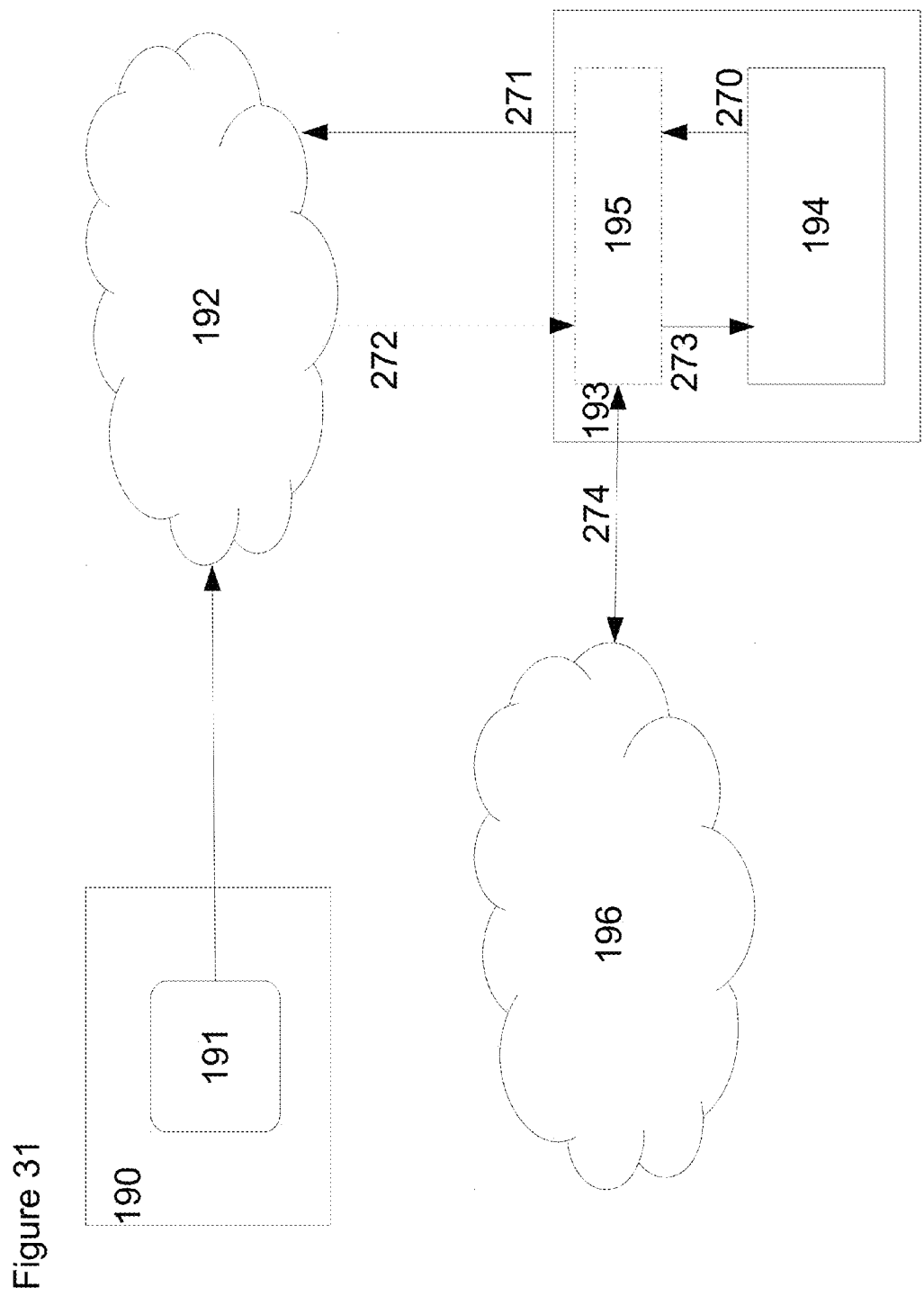
FIG. 31 is a diagrammatic depiction of a system overview for advertisement integration without audio mixing according to the present invention.
Figure 32:
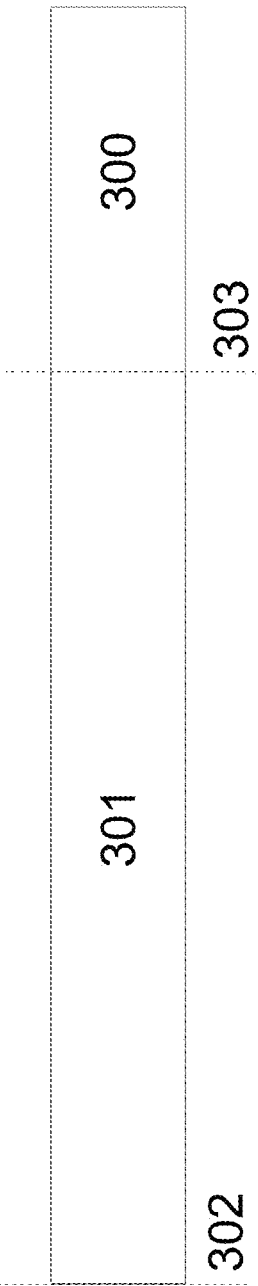
FIG. 32 is a diagrammatic depiction of an advertisement marker arrangement according to the present invention.

In cases where a radio station or show will only be integrating advertisements and will not be mixing a live stream with pre-recorded audio (e.g. music), the system contemplates certain advertisement integration means, which will work as described below, and as generally depicted in FIGS. 31 and 32.

A radio show can be recorded on a computer 190 through software 191 which would encode the audio and mark when an advertisement or other pre-recorded file needs to be played. Advertisement markers are placed after a predetermined time of audio silence. In order to achieve this, the encoding application 191 creates a lag 300 a few seconds longer then the predetermined advertisement indicating audio silence 301. Thus, if a radio personality is recording and needs to insert an advertisement break, the radio personality simply mutes or silences the microphone for 5 seconds as at 301 (for example). After 5 seconds of silence (as at 301) (as an example) the encoding application marks the audio stream not at the end 302 of the 5 seconds of silence, but at the beginning 303. This way the end listener does not hear the silence but an advertisement.

Once the pre-determined timeframe of silence has passed the application 191 prompts the radio personality to indicate how long advertisements should be played, and advertisements are integrated according to the timeframe selected. This audio stream is then encoded and marked by the application 191 and uploaded to the server or content delivery network 192 of the radio personality's choosing.

When the listener from their device 193 requests through a client application 194 (e.g. a browser or mobile app) for the radio stream, the request is sent 270 to a gateway server 195. The gateway server 195 the sends 271 the request for the audio stream to the cloud/server 192, which responds and delivers 272 the audio to the gateway server 195.

The gateway server 195 then delivers 273 the audio stream to the client 194. The gateway server 195 creates a small buffer (2-5 seconds of data), so that when an advertisement marker is identified within the audio stream, the gateway server 195 can fetch 274 an appropriate advertisement from the advertisement server 196 and integrate it at the specified time. In a mobile application, the application would have to integrate the advertisements without a gateway server 194. The mobile application would have to have it integrated into the application's source code. So it would have code that would detect an advertisement marker, and then integrate an advertisement at the start of the advertisement marker.

While the above description contains much specificity, this specificity should not be construed as limitations on the scope of the invention, but rather as an exemplification of the invention. For example, it is contemplated that the present invention essentially provides a peer-to-peer (P2P) content delivery network for delivering (e.g. streaming) select data files to an end user.

The so-called P2P Content Delivery Network (CDN) or P2P CDN according to the present invention preferably comprises a client as at 2, a P2P gateway server as at 3, a Resource Name Server (RNS) as at 4, and a computer-populated network, which computer populated network may comprise local servers, peer-connected servers, cloud lockers, cloud storage, cloud media, and/or commercial (music) streaming service provide infrastructure(s).

The client is in communication with the P2P gateway server, and the P2P gateway server is in communication with the RNS and the computer-populated network. The RNS basically functions to cache data resource locations within the computer-populated network and resolve resource requests with optimal (e.g. (a) most price efficient or (b) highest sound quality of source) data resource locations within the computer-populated network.

The P2P gateway server requests and receives optimal data resource locations via the RNS; requests and receives data files from the computer-populated network by way of the optimal data resource locations, and processes received data files for data file delivery to the client and the end user.

The content delivery network or CDN according to the present invention incorporates a number of optional but preferably add-on's the basic system of components, including certain client and/or server authentication means for verifying client and/or server authenticity as discussed in some greater detail hereinabove. Further, in an effort to enhance delivery of non-corrupt data streams, the present invention contemplates certain data delivery fragmentation means as also discussed hereinabove.

Recourse locations may be preferably indexed via certain resource indexing means cooperable in connection with the RNS for further enhancing network or method efficiency. Notably, the resource indexing means may preferably comprise certain file matching means for quickly and effectively matching data files independently from data file metadata. The file matching means according to the present invention are more fully specified in allowed U.S. patent application Ser. No. 13/065,254, now issued U.S. Pat. No. 8,589,171 to which these specifications claim a benefit, and which specifications have been incorporated by reference thereto.

The file matching means according to the present invention may thus preferably comprise certain data extraction means, certain summary statistic derivation means, certain custom marker generation means, certain custom marker association means, and certain custom marker accessing means.

The data extracting means extract waveform data from a first data file. The extracted waveform data comprise length segment values, which values are extracted relative to a data extraction baseline and comprise trough-to-baseline and peak-to-baseline length segment values. The summary statistic derivation means derive summary statistics from the extracted waveform data, which summary statistics are derived from the length segment values, and comprise trough-to-baseline and peak-to-baseline length segment statistics.

The custom marker generation means generate a custom marker based on the derived summary statistics, and the customer marker association means associate the custom marker with the first data file thereby constructing a custom marked data file. The custom marker accessing means access the custom marker when comparing a second data file to the marked data file for rendering a positive data file match.

The P2P content delivery network may further comprise certain event marker association means for associating event markers in frame headers of the data files for enhancing data file transmission as discussed in more detail hereinabove. In this last regard, the reader will recall the present invention further contemplates certain advertisement integration means, which means may be further employed for integrating advertisement content into data files via the specified event marker association means.

Given the data origin-agnostic character of the present invention, a data-routing governance system is further contemplated. The data-routing governance system according to the present invention preferably comprises, in combination, a data-routing compliance appliance or engine and the described content delivery network. Accordingly, the data-routing compliance appliance is in communication with the content delivery network, which content delivery network comprises a plurality of data sources, which sources comprise or store data files.

The content delivery network delivers select data files to an end user from an optimal data source location, which optimal data source location is selected from the group consisting of the data sources. The compliance appliance or engine according to the present invention thus provides (a) industry rights management (b) compliance monitoring and/or (c) compliance reporting of data file transmissions.

Essentially, the present invention may be said to provide functionality for (1) delivering an indirect request stream from a local server (e.g. digital radio as exemplified by PANDORA® radio); delivering an indirect request stream from a peer-connected server; delivering an indirect request stream from a second direct request source (e.g. iTunes Match or Spotify or cloud locker like DropBox or any media in the cloud); delivering an indirect request stream from a peer-connected server based on a second direct request source's right to play or stream; delivering a direct request stream from a second direct request source based upon (a) price efficiency or (b) sound quality of source; and (6) delivering a direct request stream from a peer-connected source based upon a second direct request source's right to play or stream. Given the data origin-agnostic or cloud-agnostic aspects of the present system, the system further provides (a) industry rights management (b) compliance monitoring and/or (c) compliance reporting where delivery of content is sourced from a secondary source other than the original requested source service including examples 1-6 above.

The foregoing specifications are further believed to support certain origin-agnostic data delivery methodology for optimally (e.g. cost effectively) delivering select data to an end user in a computer-populated environment. The origin-agnostic data delivery method according to the present invention may be said to preferably comprise the steps of: communicating a client, a peer-to-peer (P2P) gateway server, and a Resource Name Server (RNS) with a computer-populated network; and caching data resource locations within the computer-populated network via the RNS.

Optimal data resource locations may be requested by the P2P gateway server via the client from the RNS-cached data resource locations, which resource requests are resolved with optimal resource locations via the RNS. The optimal resource locations are received by the P2P gateway server via the RNS whereafter data files from the computer-populated network are requested by way of or as enabled by the received optimal resource locations. The requested data files are then transmitted (i.e. sent and received) and processing for data file delivery to the client.

Accordingly, although the invention has been described by reference to certain preferred and alternative embodiments, and certain methodology, it is not intended that the novel disclosures herein presented be limited thereby, but that modifications thereof are intended to be included as falling within the broad scope and spirit of the foregoing disclosure, the following claims and the appended drawings.

We claim:

1. A routing and synchronization system operable with one or more data sources for delivering selectively synchronized data files to a user in real time, the routing and synchronization system comprising:

a client cooperable with a first computer-implementable application, a gateway server, and a Resource Name Server (RNS) together in communication with a computer-populated network, the RNS for (1) caching data resource locations within the computer-populated network and (2) resolving resource requests with optimal data resource locations within the computer-populated network, the gateway server for (1) requesting and receiving optimal data resource locations via the RNS, (2) requesting and receiving data files from the computer-populated network via the optimal data resource locations, and (3) processing received data files for data file delivery to the client, the first computer-implementable application being operable to respond to interactive and non-interactive requests by synchronizing and routing synchronized, consumable, legally-protected data from a select optimal data resource location to the client for consumption, the select optimal data resource location being selected from a routing instruction fulfillment source as prompted by a routing instruction received from a routing instruction generation source, the routing instruction fulfillment and generation sources each being affiliated with a legal access point, the synchronized, consumable, legally-protected data being sourced to the consumer from a select data library.

2. The routing and synchronization system of claim 1 wherein the routing instruction fulfillment source is affiliated with at least two fulfillment-based, legal access points.

3. The routing and synchronization system of claim 1 wherein the synchronized, consumable, legally-protected data is sourced to the consumer from the select data library as governed by ID-to-hash mapping.

4. The routing and synchronization system of claim 1 comprising a second computer-implementable application operable via the RNS for (a) fragmenting data, (b) delivering fragmented data, and thereby (c) enhancing delivery of non-corrupt data streams.

5. The routing and synchronization system of claim 1 comprising a third computer-implementable application operable via the RNS for indexing resource locations and thus for enhancing network efficiency of the routing and synchronization system.

6. The routing and synchronization system of claim 5 wherein the third computer-implementable application further operates to match data files independently from data file metadata for enhancing network efficiency of the routing and synchronization system.

7. The routing and synchronization system of claim 1 comprising a compliance appliance for managing, monitoring and/or reporting data file transmission of routed, synchronized, consumable, legally-protected data from the select optimal data resource location to owners or owner agents of the routed, synchronized, consumable, legally-protected data content.

8. The routing and synchronization system of claim 1 comprising a fourth computer-implementable application for associating event markers in frame headers of the data files for enhancing data file transmission.

9. The routing and synchronization system of claim 8 wherein the fourth computer-implementable application is operable to integrate advertisement content into data files.

10. In a computer-populated environment, an origin-agnostic data delivery method for delivering a legally-protected select data file to an end user from an optimal resource location as selected from one or more data sources, the origin-agnostic data delivery method comprising the steps of:

communicating a client, a gateway server, and a Resource Name Server (RNS) within a computer-populated network;

caching data fulfillment sources within the computer-populated network via the RNS;

requesting a data fulfillment source listing by the gateway server from RNS-cached data fulfillment sources via a routing instruction generation source;

querying which of the data fulfillment sources optimally meets user-defined data transmission requirements, the query thereby defining an optimal fulfillment source;

requesting a legally-protected select data file from the optimal fulfillment source via the computer-populated network, the legally-protected select data file being sourced to the client from a select data file library;

transmitting the legally-protected select data file from the optimal fulfillment source; and processing the transmitted legally-protected select data file for delivery to the client.

11. The origin-agnostic data delivery method of claim 10 comprising the step of verifying client authenticity.

12. The origin-agnostic data delivery method of claim 10 comprising the step of verifying server authenticity.

13. The origin-agnostic data delivery method of claim 10 comprising the step of fragmenting data files during data file delivery for enhancing delivery of non-corrupt data streams.

14. The origin-agnostic data delivery method of claim 10 comprising the step of indexing recourse locations for enhancing method efficiency.

15. The origin-agnostic data delivery method of claim 14 comprising the step of matching data files independently from data file metadata for enhancing method efficiency.

16. The origin-agnostic data delivery method of claim 15 wherein the step of matching data files comprises the steps of:

extracting waveform data from a first data file, the extracted waveform data comprising length segment values, the length segment values being extracted relative to a data extraction baseline and comprising trough-to-baseline and peak-to-baseline length segment values; deriving summary statistics from the extracted waveform data, the summary statistics being derived from the length segment values, the summary statistics comprising trough-to-baseline and peak-to-baseline length segment statistics;

generating a custom marker based on the derived summary statistics; associating the custom marker with the first data file thereby constructing a custom marked data file; and accessing the custom marker when comparing a second data file to the custom marked data file for rendering a positive media file match.

17. The origin-agnostic data delivery method of claim 10 comprising the step(s) of providing (a) industry rights management; (b) compliance monitoring; and/or (c) compliance reporting of data file transmission of routed, legally-protected data from the at least two data resource locations, the industry rights management; (b) compliance monitoring; and/or (c) compliance reporting being due owners or owner agents of the legally-protected select data file.

18. The origin-agnostic data delivery method of claim 10 comprising the step of associating event markers in frame headers of the data files for enhancing data file transmission.

19. The origin-agnostic data delivery method of claim 18 comprising the step of integrating advertisement content into data files.

20. A data-routing governance system for governing and reporting data routing within a content delivery network, the data-routing governance system comprising a data-routing compliance appliance, the data-routing compliance appliance being in communication with a routing and synchronization system operable (a) within the content delivery network and (b) with one or more data sources, the content delivery network comprising a plurality of routing instruction fulfillment sources, the routing instruction fulfillment sources each comprising data files, the content delivery network for delivering select data files to an end user from an optimal data fulfillment source as prompted by a routing instruction generation source, the optimal data fulfillment source being selected from the group comprising the routing instruction fulfillment sources, the routing instruction fulfillment and routing instruction generation sources each defining a legal access point, each legal access point being associated with a data file library, the select data files being sourced to the end user from a select data file library, the compliance appliance providing (a) industry rights management (b) compliance monitoring and/or (c) compliance reporting of data file transmissions of routed, legally-protected data from the optimal data source location to owners or owner agents of the select data files.

21. A routing and synchronization system operable with one or more data sources within a network-based media content playback environment for providing a selectively sourced media content broadcast to a consumer, the routing and synchronization system comprising:

a primary computer-implementable application for synchronizing and routing consumable legally-protected media content to the consumer from a select routing instruction fulfillment source as prompted by routing and playback instructions generated via a routing instruction generation source, the select routing instruction fulfillment source being affiliated with at least one legal access point, the primary computer-implementable application being operable to (a) generate the routing and playback instructions via the routing instruction generation source for governing playback of the consumable legally-protected media content via a content-delivery primary channel; (b) establish an instruction-passing secondary channel to the consumer over an operable network infrastructure; and (c) pass the routing and playback instructions to the consumer via the instruction-passing secondary channel for sourcing the consumable legally-protected media content to the consumer from the at least one legal access point.

22. The routing and synchronization system of claim 21 whereby the selectively sourced media content broadcast is characterized by direct source delivery of the consumable legally-protected media content to the consumer from a consumer-accessible content library as prompted by the routing instruction generation source.

23. The routing and synchronization system of claim 22 wherein the routing instruction generation source is a select initiating source, the select initiating source being selected from the group consisting of an incoming indirect source and a consumer-affiliated direct source.

24. The routing and synchronization system of claim 23 wherein the consumable legally-protected media content is sourced to the consumer as governed by pre-defined parameters, the pre-defined parameters selected from a parameter group comprising price efficiency parameters and data quality parameters, the price efficiency parameters for governing media playback from a cost effective content library, the data quality parameters for governing media playback from a high quality content library.

25. The routing and synchronization system of claim 23 wherein the consumer-affiliated direct source is peer-connected, the consumable legally-protected media content being directly sourced to the consumer based upon the consumer-affiliated direct source's legal right to source said consumable legally-protected media content.

26. The routing and synchronization system of claim 21 comprising a compliance appliance for providing (a) industry rights management, (b) compliance monitoring and/or (c) compliance reporting, said compliance appliance thus for managing, monitoring and/or reporting transmission of the consumable legally-protected content to owners or owner agents of the consumable legally-protected media content.

27. The routing and synchronization system of claim 21 comprising a secondary computer-implementable application operable for identifying content prompted by the routing instruction generation source and determining the select routing instruction fulfillment source by querying the existence of matching files from the at least one legal access point.

28. The routing and synchronization system of claim 21 wherein the computer-implementable application is operable to associate an event reference with the routing and playback instructions, the event reference and routing and playback instructions together for sourcing the consumable legally-protected media content to the consumer from the select content library.

29. The routing and synchronization system of claim 28 wherein a custom media format accommodates the event reference and routing and playback instructions during an encoding process.

30. The routing and synchronization system of claim 21 wherein the routing and playback instructions are associated with a select file location, the select file location being selected from a location group, the location group consisting of a file start location or a file end location.

31. The routing and synchronization system of claim 21 wherein the routing and playback instructions are timed metadata.

32. The routing and synchronization system of claim 21 wherein the routing and playback instructions are subject to a number of select playback events, the number of select playback events being selected from the group comprising (a) play, (b) pause, (c) stop, (d) load, (e) seek, (f) comment, (i) comment start, (ii) comment end, (g) audio mix, (h) playback speed, (j) playback direction, and (k) content identification.

33. A non-transitory computer-implementable media content-sharing system, the computer-implementable media content-sharing system being operable within a network-based media content playback environment comprising at least two computers for providing a selectively sourced media content broadcast to a consumer having access to a first of the least two computers, the computer-implementable media content-sharing system comprising and providing computer-implementable instructions for (a) establishing an instruction-passing secondary channel to a consumer over an operable network; (b) generating routing and playback instructions for governing playback of the consumable legally-protected media content via a content-delivery primary channel; and (c) passing the routing and playback instructions to the consumer via the instruction-passing secondary channel for sourcing consumable legally-protected media content to the consumer from at least one legal access point.

* * * * *

UNITED STATES PATENT AND TRADEMARK OFFICE
CERTIFICATE OF CORRECTION

| | | |
|---|---|---|
| PATENT NO. | : 9,549,024 B2 | Page 1 of 1 |
| APPLICATION NO. | : 14/099348 | |
| DATED | : January 17, 2017 | |
| INVENTOR(S) | : Gregory H. Leekley, Alexander Savenok and Pavel Savenok | |

It is certified that error appears in the above-identified patent and that said Letters Patent is hereby corrected as shown below:

In the Claims

Claim 14, Column 22, Line 25, delete "recourse" and insert --resource--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*